(12) United States Patent
Groben et al.

(10) Patent No.: US 12,410,851 B2
(45) Date of Patent: Sep. 9, 2025

(54) DRIVE UNIT FOR ACTUATING A PLURALITY OF FUNCTIONS OF AN AIR VENT SYSTEM OF AN AIR DISTRIBUTION SYSTEM, AND AIR VENT SYSTEM WITH A DRIVE UNIT OF THIS TYPE

(71) Applicant: ILLINOIS TOOL WORKS INC., Glenview, IL (US)

(72) Inventors: Manfred Groben, Gau-Bickelheim (DE); Thomas Pacher, Semback (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 801 days.

(21) Appl. No.: 17/430,096

(22) PCT Filed: Feb. 17, 2020

(86) PCT No.: PCT/US2020/018510
§ 371 (c)(1),
(2) Date: Aug. 11, 2021

(87) PCT Pub. No.: WO2020/172098
PCT Pub. Date: Aug. 27, 2020

(65) Prior Publication Data
US 2022/0145970 A1    May 12, 2022

(30) Foreign Application Priority Data

Feb. 19, 2019 (DE) .................... 10 2019 104 176.7
Sep. 18, 2019 (DE) .................... 10 2019 125 078.1

(51) Int. Cl.
*F16H 37/12* (2006.01)
*B60H 1/34* (2006.01)

(52) U.S. Cl.
CPC ............. *F16H 37/122* (2013.01); *B60H 1/34* (2013.01); *B60H 2001/3471* (2013.01); *B60H 2001/3478* (2013.01)

(58) Field of Classification Search
CPC . B60H 1/34; B60H 2001/3471; F16H 37/122; F24F 2013/1473
See application file for complete search history.

(56) References Cited

U.S. PATENT DOCUMENTS

| | | | |
|---|---|---|---|
| 4,749,004 A | 6/1988 | Peash | |
| 5,159,854 A | 11/1992 | Mino | |
| 6,732,603 B1 * | 5/2004 | Hsu | ...................... F16H 37/065 74/354 |

FOREIGN PATENT DOCUMENTS

| | | |
|---|---|---|
| CN | 2672379 Y | 1/2005 |
| CN | 1580662 A | 3/2005 |

(Continued)

OTHER PUBLICATIONS

PCT, International Search Report and Written Opinion, International Application No. PCT/US2020/018510; date of mailing Jun. 18, 2020, 24 pages.

*Primary Examiner* — Allen R. B. Schult
(74) *Attorney, Agent, or Firm* — THOMPSON HINE LLP

(57) ABSTRACT

A drive unit (1) for actuating a plurality of functions of an air vent system or of an air distribution system, having an electric motor drive (3) with a drive shaft which can be driven in a first rotational direction or in a second rotational direction, and a switching mechanism with at least one first and one second output shaft (5), via which functions of the air vent system can be actuated, the switching mechanism being configured, during a drive of the drive shaft in the first rotational direction, to transmit a torque from the drive shaft only to the first output shaft (5), and, during a drive of the drive shaft in the second rotational direction, to transmit a (Continued)

torque from the drive shaft only to the second output shaft (5).

11 Claims, 18 Drawing Sheets

(56) References Cited

FOREIGN PATENT DOCUMENTS

| CN | 102472365 A | 5/2012 |
|---|---|---|
| CN | 106515379 A | 3/2017 |
| CN | 107685612 A | 2/2018 |
| CN | 109314308 A | 2/2019 |
| DE | 19910774 A1 | 9/2000 |
| JP | S6144243 A | 3/1986 |
| JP | H0524429 A | 2/1993 |

* cited by examiner

DRIVE UNIT FOR ACTUATING A PLURALITY OF FUNCTIONS OF AN AIR VENT SYSTEM OF AN AIR DISTRIBUTION SYSTEM, AND AIR VENT SYSTEM WITH A DRIVE UNIT OF THIS TYPE

TECHNICAL FIELD

The present invention relates to a drive unit as claimed in the preamble of independent patent claim 1.

Accordingly, the invention relates, in particular, to a drive unit for actuating a plurality of functions of an air vent system, the drive unit having an electric motor drive with a drive shaft which can be driven as required in a first rotational direction or in a second rotational direction.

Moreover, the invention relates to a drive unit for individually setting an air flow quantity which passes an air duct of a multiplicity of air ducts of an air distribution system per unit time. The air distribution system is positioned, for example, between an air conditioning system and a multiplicity of air vents.

Furthermore, the invention relates to an air vent system which is, in particular, part of a ventilation system for a vehicle, the air vent system having at least one air vent and a drive unit for actuating as required different functions of the at least one air vent.

BACKGROUND

In the case of the ventilation apparatuses for vehicles, air vents or air outlet nozzles are generally used which make targeted control of the exiting air jet possible. Air vents of this type serve to feed, in particular, fresh air into a vehicle interior compartment.

Here, the air flow flows via an inlet opening of the air vent into an air duct which is delimited at least in regions by way of the housing wall of the air vent, through said air duct and finally through the outlet opening of the air vent into the interior compartment of a vehicle (for example, a passenger car or truck). The air quantity which flows into the interior compartment of the vehicle via the air vent per unit time can as a rule be controlled via an actuating member which is provided adjustably in the air duct of the air vent and is configured, for example, as a throttle flap or closure flap.

Furthermore, the air vents which are considered in this document are as a rule provided with air guiding elements which direct the air flow or regulate the air flow and can be manipulated accordingly, in order to bring about a targeted deflection of the air flow which is output by the air vent, for example, in a vertical and/or horizontal direction.

Actuating members of this type (fan flaps, closure flaps, throttle flaps and/or air guiding elements which direct the air flow or regulate the air flow) are usually set individually by hand. Here, not only is a distribution of the air flow which enters into the interior compartment of the vehicle, for example, to the footwell, to the medium height in the motor vehicle or for defrosting onto the windshield possible; rather, actuating members of this type can often also be adjusted, in order for it to be possible for the proportion of air which flows in freshly or the air which is cooled by way of a cooling unit and/or the recirculated air quantity to be changed for temperature regulation.

Accordingly, a multiplicity of different functions can as a rule be set individually in the case of an air vent.

Secondly, a trend is to be seen in air vent technology to the extent that air vents are increasingly to be actuated not only manually, but rather additionally or exclusively by motor. For this purpose, it is generally known that, in order to manipulate the individual actuating members or the actuating member of an air vent, the actuating member or the actuating members is/are assigned a motorized, in particular electric motor, drive which is coupled or can be coupled mechanically to the corresponding actuating member of the air vent in such a way that the actuating member which is assigned to the drive can be adjusted relative to the housing of the air vent by way of actuation of the motorized drive.

It is not uncommon in this context that, to this end, drive units of the type mentioned at the outset which are known from the prior art as a rule have corresponding electric motor drives (electric motors) which are configured in each case for adjusting a correspondingly associated actuating member in the air vent. In particular, in each case one electric motor drive is provided for each type of movement of the air guiding elements to be manipulated (for example, rotational movement or longitudinal displacement via the transmission elements).

Therefore, a multiplicity of electric motor drives are usually likewise provided in the case of air vent systems which have a multiplicity of setting and adjusting options. This has a negative effect both on the costs and on the required installation space.

Said problems exist in the case of a multiplicity of applications of air vent systems. Thus, for example, air vents for motor vehicles often have at least three electric motor drives for adjusting vertical louvers, horizontal louvers and a closing flap, which electric motor drives carry out the movement of the vertical louvers, the horizontal louvers and the closure flap. If the air vent system comprises two air vents with corresponding vertical louvers, horizontal louvers and closure flaps, there are at least six different functions which can be driven/actuated as required in each case by an electric motor drive.

The costs for air vents or air vent systems of this type are relatively high on account of the number of electric motor drives. Furthermore, the air vents which often also have a gear mechanism require additional installation space for receiving the electric motor drives.

In addition, the electric motor drives have a certain weight, with the result that the weight for an air vent or an air vent system increases considerably in the case of a multiplicity of electric motor drives.

With regard to a weight reduction, a cost saving and the small available installation space, it would therefore be advantageous to carry out the functions, for example, of one air vent or, for example, a plurality of air vents which are combined to form an air vent system by way of a reduced number of electric motor drives.

SUMMARY

It is therefore an object of the present invention to specify a drive unit for actuating a plurality of functions of an air vent or of an air vent system, which drive unit has an electric motor drive which can actuate/drive a plurality of functions of the air vent or of the air vent system.

Furthermore, a corresponding air vent system is to be specified, in the case of which various functions of the air vent system can be actuated by an electric motor, it being possible for the weight of the air vent system to be reduced, and, furthermore, it being possible for the costs for manufacturing an air vent system of this type to be reduced, an amount of installation space which is necessary for the installation of the air vent system being kept as small as possible at the same time.

Accordingly, the invention relates, in particular, to a drive unit for actuating a plurality of functions of an air vent system, it being possible for said functions to be actuated temporally after one another, but independently of one another. In this context, in particular, the adjusting or pivoting of horizontal louvers, vertical louvers and/or a ventilation flap of the air vent system are to be understood as functions of an air vent system. It goes without saying, however, that further (other) functions fundamentally also come into consideration.

The drive unit according to the invention has an (and preferably precisely one) electric motor drive with a drive shaft which can be driven as required in a first rotational direction or in an opposite, second rotational direction.

In accordance with one aspect of the present invention, it is provided according to the invention, in particular, that the drive unit has a switching mechanism which is assigned to the drive shaft of the electric motor drive, with at least one first and one second output shaft. Said switching mechanism is preferably of purely mechanical construction.

Corresponding functions of an air vent system can be actuated in each case via the first and at least one second output shaft of the switching mechanism, such as the adjusting of air guiding elements which bring about a vertical air deflection, and the adjusting of air guiding elements which bring about a horizontal air deflection.

In accordance with one aspect of the present invention, the switching mechanism is configured, in the case of a drive of the drive shaft of the electric motor drive in the first rotational direction, to transmit a torque from the drive shaft only, and in particular exclusively only, to the first output shaft of the switching mechanism, in order for it to be possible in this way for that function of the air vent system which is assigned to the first output shaft to be actuated.

The switching mechanism of the drive unit according to the invention in accordance with said aspect is configured, furthermore, in the case of a drive of the drive shaft of the electric motor drive in the second rotational direction, that is to say in the rotational direction which is opposed to the first rotational direction, to transmit a torque from the drive shaft of the electric motor drive only, and in particular exclusively only, to the second output shaft of the switching mechanism, in order for it to be possible in this way for a second function of the air vent system to be actuated.

Accordingly, it is proposed that two functions of the air vent system can be actuated independently of one another (but temporally shifted with respect to one another) by way of a single electric motor drive, in a manner which is dependent on its rotational direction.

In order for it to be possible for a functional separation of this type which is dependent on the rotational direction of the electric motor drive to be achieved, various, in particular mechanical implementations are worth considering for the switching mechanism.

It is thus provided, for example, in accordance with one embodiment of the drive unit according to the invention that the switching mechanism has a first freewheel which is assigned to the first output shaft of the switching mechanism and a further, second freewheel which is assigned to the second output shaft of the switching mechanism, the first freewheel being configured to transmit a torque from the drive shaft of the electric motor drive to the first output shaft of the switching mechanism only when the electric motor drive is rotating in its first rotating direction, and the second freewheel being configured to transmit a torque from the drive shaft of the electric motor drive to the second output shaft of the switching mechanism only when the electric motor drive is rotating in its second rotational direction.

As an alternative or in addition to this, however, it is also conceivable that the switching mechanism has a mechanical actuating element, in particular in the form of a brake, which is assigned to the drive shaft of the electric motor drive and is designed, in the case of a drive of the drive shaft of the electric motor drive in the first rotational direction, to move and, in particular, to pivot the drive shaft or a first clutch plate which is connected to the drive shaft relative to the first output shaft of the switching mechanism or relative to a second clutch plate which is connected to the first output shaft of the switching mechanism in the direction of the first output shaft of the switching mechanism in such a way that the drive shaft of the electric motor drive couples to the first output shaft.

In addition to this, the mechanical actuating element of the switching mechanism of the drive unit should be configured, in particular, in the case of a drive of the drive shaft of the electric motor drive in the second rotational direction, that is to say in the rotational direction which is opposed to the first rotational direction, to move, in particular to pivot, the drive shaft of the electric motor drive or a first clutch plate which is connected to the drive shaft of the electric motor drive relative to the second output shaft of the switching mechanism or relative to a third clutch plate which is connected to the second output shaft of the switching mechanism in the direction of the second output shaft of the switching mechanism in such a way that the drive shaft of the electric motor drive couples to the second output shaft of the switching mechanism.

In order for it to be possible for the coupling as required of the drive shaft of the electric motor drive to the first or second output shaft of the switching mechanism to be brought about, various embodiments are worth considering.

In accordance with one preferred embodiment, the drive shaft of the electric motor drive is assigned a first clutch plate, to which the drive shaft of the electric motor drive is connected, for example via a toothing connection or via a frictionally locking connection. In accordance with embodiments of the present invention, the first clutch plate which is connected to the drive shaft of the electric motor drive can be connected in each case via a toothing connection or via a frictionally locking connection or a combination thereof to the second or third clutch plate, in order thus to couple the drive shaft of the electric motor drive either to the first or to the second output shaft of the switching mechanism, in a manner which is dependent on the rotational direction of the drive shaft of the electric motor drive.

In accordance with a further (second) aspect of the present invention, said invention relates to a drive unit for actuating a plurality of functions of an air vent system, the drive unit having an electric motor drive with a drive shaft which can be driven as required in a first rotational direction or in a second rotational direction which is opposed to said first rotational direction. In the case of said aspect of the present invention, it is provided, in particular, that the drive unit has a switching mechanism which is assigned to the drive shaft with at least one first and one second output shaft, via which in each case one function of the air vent system can be actuated.

For example, it is conceivable that the first output shaft of the switching mechanism is configured to manipulate a first group of air guiding elements which direct the air flow or regulate the air flow, whereas the second output shaft of the switching mechanism serves to manipulate as required a second group of air guiding elements which direct the air flow or regulate the air flow.

In the case of the further aspect of the present invention, the switching mechanism is configured, in particular, in the case of a drive of the drive shaft of the electric motor drive in the first rotational direction, to couple one of the two output shafts of the switching mechanism to an input shaft of the switching mechanism, and optionally to decouple the other output shaft of the switching mechanism from the input shaft of the switching mechanism.

Here, the input shaft of the switching mechanism can be connected either directly or via a gear mechanism to the drive shaft of the electric motor drive in such a way that torques can be transmitted from the drive shaft of the electric motor drive to the input shaft of the switching mechanism. As an alternative to this, it goes without saying, however, that it is also conceivable if the input shaft of the switching mechanism is identical to the drive shaft of the electric motor drive or is configured as an extension of the drive shaft of the electric motor drive.

In accordance with the second aspect of the present invention, the switching mechanism is configured, furthermore, in the case of a drive of the drive shaft in the rotational direction which is opposed to the first rotational direction (and therefore in the case of a drive of the input shaft of the switching mechanism in the second rotational direction), to transmit a torque from the drive shaft of the electric motor drive via the input shaft of the switching mechanism to the output shaft of the switching mechanism, which output shaft was (previously) coupled to the input shaft.

It is to be noted at this point that, in addition to or instead of output shafts, output gears which are configured, in particular, in the form of pin wheels can be provided, via which output gears in each case one function of the air vent system can be actuated. Here, the distribution gear mechanism is configured to selectively transmit a torque from the drive shaft of the electric motor drive to one of the at least three output gears of the distribution gear mechanism.

In one possible realization of the switching mechanism which is assigned to the drive shaft of the electric motor drive, said switching mechanism is configured as a distribution gear mechanism, as will be described in greater detail in the following text in conjunction with a further aspect of the present invention.

In accordance with said further (third) aspect of the present invention, said invention relates to a drive unit for actuating a plurality of functions of an air vent system, the drive unit having an electric motor drive with a drive shaft which can be driven as required in a first rotational direction or in a second drive direction which is opposed thereto.

In the case of the third aspect of the present invention, the drive unit has a distribution gear mechanism which is assigned to the drive shaft of the electric motor drive, with a first, a second and at least one third output shaft. In each case one function of the air vent system can be actuated via said output shafts of the distribution gear mechanism, such as the adjusting of first actuating members which guide the air flow or regulate the air flow, the adjusting of second actuating members which guide the air flow or regulate the air flow and the adjusting of a throttle and/or closure flap of an air vent of the air vent system.

The distribution gear mechanism which has the drive unit in accordance with the third aspect of the present invention is configured, in particular, to selectively transmit a torque from the drive shaft of the electric motor drive to one of the at least three output shafts of the distribution gear mechanism and, in particular, to precisely one of the at least three output shafts of the distribution gear mechanism.

In one preferred realization of the drive unit in accordance with the third aspect of the present invention, the distribution gear mechanism is configured, in the case of a drive of the drive shaft of the electric motor drive in the first rotational direction, to couple one (and, in particular, precisely one) of the at least three output shafts of the distribution gear mechanism to the drive shaft of the electric motor drive or to an input shaft of the distribution gear mechanism, which input shaft is coupled to the drive shaft of the electric motor drive, and optionally to decouple the other output shafts of the distribution gear mechanism from the drive shaft of the electric motor drive or an input shaft of the distribution gear mechanism, which input shaft is coupled to the drive shaft of the electric motor drive.

In addition to this, in the case of said embodiment, the distribution gear mechanism should preferably be configured, in the case of a drive of the drive shaft of the electric motor drive in the second rotational direction, to transmit a torque from the drive shaft of the electric motor drive either directly or via the input shaft of the distribution gear mechanism to, and preferably exclusively only to, that output shaft of the distribution gear mechanism which is coupled to the input shaft or to the drive shaft of the electric motor drive.

In order for it to be possible for said functionality of the distribution gear mechanism to be realized, it is provided in accordance with embodiments of the drive unit according to the invention in accordance with the third aspect of the present invention that the distribution gear mechanism has a corresponding control mechanism.

Said control mechanism can be connected via a first freewheel to the input shaft of the distribution gear mechanism or the drive shaft of the electric motor drive in such a way that, exclusively only in the case of a drive of the drive shaft of the electric motor drive in the first rotational direction, a torque is transmitted from the drive shaft of the electric motor drive to the control mechanism.

Furthermore, the distribution gear mechanism can have a distribution mechanism which is coupled via a second freewheel either to the input shaft of the distribution gear mechanism or to the drive shaft of the electric motor drive in such a way that, exclusively only in the case of a drive of the drive shaft of the electric motor drive in the second rotational direction, a torque is transmitted from the drive shaft of the electric motor drive to the distribution mechanism.

It is preferred here if the distribution mechanism has a distribution axle with a distribution gear for each output shaft of the distribution gear mechanism, that is to say for each of the at least three output shafts of the distribution gear mechanism, to which distribution gear only and, in particular, exclusively only in the case of a drive of the drive shaft of the electric motor drive in the second rotational direction, a torque is transmitted in each case from the drive shaft of the electric motor drive.

As an alternative or in addition to this, it is advantageous, furthermore, if the distribution gear mechanism has a suitable coupling mechanism for each distribution gear, via which coupling mechanism the corresponding distribution gear of the distribution mechanism can be coupled as required to the correspondingly associated output shaft of the at least three output shafts of the distribution gear mechanism.

It is conceivable in this context, in particular, that the coupling mechanism is configured to couple as required the corresponding distribution gear of the distribution mechanism to the associated output shaft of the at least three output shafts of the distribution gear mechanism via a frictional toothing system, a frictionally locking connection and/or via a positively locking connection (or a combination thereof).

In one embodiment of the control mechanism, which embodiment is particularly easy to realize but nevertheless functions reliably, said control mechanism has a control element which, in the case of a drive of the drive shaft of the electric motor drive in the first rotational direction, can be actuated, in order to selectively couple a distribution gear of the distribution mechanism to the correspondingly associated output shaft of the at least three output shafts of the distribution gear mechanism.

In accordance with embodiments, the control element can be configured in the form of at least one cam plate, in the form of at least one cam disk, in the form of at least one slotted guide and/or in the form of at least one eccentric. It goes without saying, however, that other identically acting control elements are also fundamentally worth considering for this purpose.

The control element should be configured, in particular, in the case of a drive of the electric motor drive in the first rotational direction, to be turned relative to the distribution gears of the distribution mechanism about a rotational axis, and to couple the distribution gears of the distribution mechanism to the correspondingly associated output shaft of the distribution gear mechanism in a manner which is dependent on a rotational angle.

In accordance with a further aspect of the invention, the control element can be actuated selectively in such a way as to couple precisely one distribution gear to the correspondingly associated output shaft or the correspondingly associated output gear of the distribution gear mechanism, or so as to couple a plurality of distribution gears to the correspondingly associated output shafts or the correspondingly associated output gears of the distribution gear mechanism, or so as to decouple all the distribution gears from the correspondingly associated output shafts or the correspondingly associated output gears of the distribution gear mechanism.

In accordance with one superordinate aspect of the present invention, the drive unit has at least one sensor, in particular position sensor, in order to directly or indirectly detect a switching state of the drive unit and the switching mechanism and/or the distribution gear mechanism, and/or in order to directly or indirectly detect a function of the air vent system, which function is actuated by the drive unit, such as a position or a location of at least one air guiding element which directs the air flow or regulates the air flow and which can be actuated as required via the drive unit.

In accordance with a further (fourth) aspect of the present invention, a drive unit is provided for actuating a plurality of functions of an air vent system or of an air distribution system, in particular for individually setting an air flow quantity which passes an air duct of a multiplicity of air ducts of the air distribution system per unit time, the drive unit having a first electric motor drive with a first drive shaft and a second electric motor drive with a second drive shaft which can be driven as required in each case in a first rotational direction or in a second rotational direction. The drive unit has a distribution gear mechanism which is assigned to the first drive shaft of the first electric motor drive and the second drive shaft of the second electric motor drive, with a first, a second and at least one third output shaft or with a first, a second and with at least one third output gear, in particular in the form of a pin wheel, via which in each case one function of the air vent system can be actuated, the distribution gear mechanism being configured to transmit torque from the first drive shaft of the first electric motor drive to one of the at least three output shafts or to one of the at least three output gears of the distribution gear mechanism selectively by means of a distribution mechanism, and to couple one of the at least three output shafts or one of the at least three output gears to the distribution mechanism by means of a control mechanism which is assigned to the second drive shaft of the second electric motor drive, and optionally to decouple the other output shafts or output gears from the distribution mechanism.

According to said further aspect, the distribution mechanism has a distribution axle with a distribution gear for each output shaft or for each output gear of the distribution gear mechanism, to which distribution gear a torque is transmitted from the first drive shaft of the first electric motor drive selectively in a first or second rotational direction.

The distribution gear mechanism has a coupling mechanism for each distribution gear, via which coupling mechanism the corresponding distribution gear can be coupled as required to the associated output shaft or to the associated output gear of the distribution gear mechanism.

Here, the coupling mechanism is preferably configured to couple the corresponding distribution gear as required to the associated output shaft or to the associated output gear of the distribution gear mechanism via a frictional toothing connection, a frictionally locking connection, a positively locking connection or a combination thereof.

The control mechanism has a control element, in particular in the form of at least one cam plate, at least one cam disk, at least one slotted guide and/or at least one eccentric, which control element, in the case of a drive of the second drive shaft of the second electric motor drive, can be actuated, in order to selectively couple the distribution gear to the correspondingly associated output shaft or to the correspondingly associated output gear of the distribution gear mechanism.

In this context, the control element is configured, in particular, in the case of a drive of the second electric motor drive, to be rotated relative to the distribution axles or distribution gears about a rotational angle, and to couple the distribution axles or the distribution gears to the correspondingly associated output shaft or to the correspondingly associated output gear of the distribution gear mechanism in a manner which is dependent on a rotational angle.

In accordance with a further aspect of the invention, the control element can be actuated selectively in such a way as to couple precisely one distribution gear to the correspondingly associated output shaft or the correspondingly associated output gear of the distribution gear mechanism, or so as to couple a plurality of distribution gears to the correspondingly associated output shafts or the correspondingly associated output gears of the distribution gear mechanism, or so as to decouple all the distribution gears from the correspondingly associated output shafts or the correspondingly associated output gears of the distribution gear mechanism.

In accordance with a further (fifth) aspect, a drive unit is provided for actuating a plurality of functions of an air vent system or of an air distribution system, in particular for individually setting an air flow quantity which passes an air duct of a plurality of air ducts of the air distribution system per unit time, the drive unit having an electric motor drive with a drive shaft which can be driven as required in a first rotational direction or in a second rotational direction. The drive unit has a distribution gear mechanism which is assigned to the drive shaft of the electric motor drive, with a first, a second and at least one third output shaft or with a first, a second and with at least one third output gear, in particular in the form of a pin wheel, via which in each case one function of the air vent system can be actuated, the distribution gear mechanism having a drive gear which can be coupled or can be decoupled to/from one or more output shafts or one or more output gears, the distribution gear mechanism being assigned a coupling mechanism, via which, in the case of a drive of the drive shaft in the first rotational direction, one or more distribution gears which is/are assigned to the output shafts or output gears is coupled or decoupled to/from the drive gear, and a torque being transmitted from the drive shaft via the drive gear to one or more coupled output shafts or output gears, and, in the case of a drive of the drive shaft in the second rotational direction, a switchover being carried out in each case between coupling and driving.

In accordance with a further aspect of the invention, a drive unit is provided for actuating a plurality of functions of an air vent system or of an air distribution system, in particular for individually setting an air flow quantity which passes an air duct of a multiplicity of air ducts of the air distribution system per unit time, the drive unit having an electric motor drive with a drive shaft which can be driven as required in a first rotational direction or in a second rotational direction. The drive unit has a distribution gear mechanism which is assigned to the drive shaft of the electric motor drive, with a first, a second and at least one third output shaft or with a first, a second and with at least one third output gear, in particular in the form of a pin wheel, via which in each case one function of the air vent system can be actuated, the distribution gear mechanism having a drive gear which can be coupled or can be decoupled to/from one or more output shafts or one or more output gears, a pin or sliding block being guided in a slotted guide curve in such a way that the pin or sliding block, in the case of a drive with changing rotational directions, first of all drives a cam disk via drivers and couples or decouples one or more of the output shafts or output gears to/from the drive gear, and afterward drives the coupled output shaft or output shafts or output gear or output gears by means of the drive gear.

In particular, a/the pin or sliding block is guided in a/the slotted guide curve on a first and a second radius, the pin or sliding block, being guided, in the case of the drive in the first rotational direction, first of all on the first radius and in the process driving a/the cam disk as far as a position, in which the one or plurality of output shafts or output gears to be coupled is/are coupled to the drive gear, the pin or sliding block being guided, in the case of a subsequent drive in the second rotational direction, via the slotted guide curve to the second radius, the pin or sliding block driving the drive gear, in the case of a subsequent renewed drive in the first rotational direction, in a manner which is guided on the second radius until the one or more coupled output shaft or output shafts or output gear or output gears has/have reached a desired position, the pin or sliding block being guided on the second radius, in the case of a subsequent renewed drive in the second rotational direction, until the pin or sliding block changes back to the first radius.

In accordance with a further (sixth) aspect, a drive unit is provided for actuating a plurality of functions of an air vent system or of an air distribution system, in particular for individually setting an air flow quantity which passes an air duct of a multiplicity of air ducts of the air distribution system per unit time, the drive unit having an electric motor drive with a drive shaft which can be driven as required in a first rotational direction or in a second rotational direction. The drive unit has a switching mechanism which is assigned to the drive shaft, with at least one first output shaft and one second output shaft, via which in each case one function of the air vent system can be actuated, the switching mechanism being configured, in the case of a drive of the drive shaft in the first rotational direction, to transmit a torque from the drive shaft only to the first output shaft, and, in the case of a drive of the drive shaft in the second rotational direction, to transmit a torque from the drive shaft to the first output shaft and to the second output shaft.

Furthermore, the present invention relates to an air vent system with at least one air vent and a drive unit of the abovementioned types for actuating different functions of the at least one air vent as required.

BRIEF DESCRIPTION OF THE DRAWINGS

In the following text, exemplary embodiments of the solution according to the invention will be described in greater detail with reference to the appended drawings, in which.

DETAILED DESCRIPTION

Figure 1:
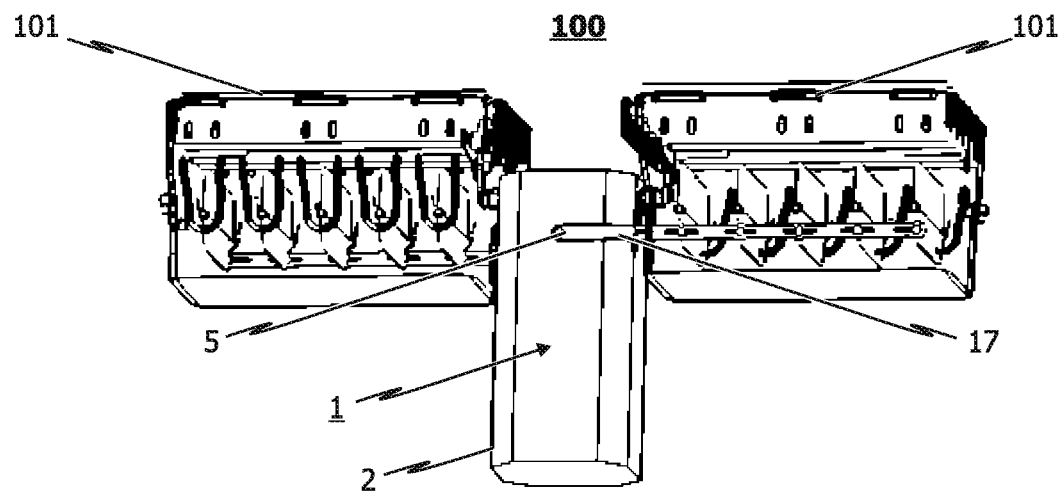
FIG. 1 diagrammatically shows a partially sectioned, isometric view of one exemplary embodiment of the air vent system according to the invention with two air vents which are arranged next to one another and a (common) drive unit for actuating different functions of the two air vents of the air vent system as required, FIG. 2 diagrammatically shows a partially sectioned, isometric view of the exemplary embodiment of the air vent system according to the invention in accordance with FIG. 1, with a first embodiment of a drive unit which is used in the case of said air vent system, to be precise without a housing of the drive unit, FIG. 3 diagrammatically shows a partially sectioned, isometric view of a second exemplary embodiment of a drive unit for the exemplary embodiment of the air vent system according to the invention in accordance with FIG. 1, to be precise without a housing of the drive unit, FIG. 4 diagrammatically shows an isometric view of a further exemplary embodiment of a drive unit for actuating different functions of an air vent or of an air vent system as required, for example of an air vent system in accordance with FIG. 1, FIG. 5 diagrammatically shows an isometric view of a further exemplary embodiment of the drive unit according to the invention for actuating different, in particular two, functions of an air vent or of an air vent system as required, for example of an air vent system in accordance with FIG. 1, FIG. 6 diagrammatically shows an isometric view of the electric motor drive with part of the components of the switching mechanism which is used in the case of the drive unit in accordance with FIG. 5, FIG. 7 diagrammatically shows a partially sectioned, isometric view of one conceivable development of the air vent system in accordance with FIG. 1, in particular with up to eight actuable functions, FIG. 8 diagrammatically shows a partially sectioned, isometric view of a third exemplary embodiment of a drive unit according to the invention, FIG. 9 diagrammatically shows a partially sectioned, isometric view of a fourth exemplary embodiment of a drive unit according to the invention, in particular for up to two functions, FIG. 10 diagrammatically shows a partially sectioned, isometric view of a fifth exemplary embodiment of a drive unit according to the invention, in particular for up to eight functions, FIG. 11 diagrammatically shows a partially sectioned, isometric view of a region of a sixth exemplary embodiment of a drive unit according to the invention, FIG. 12 diagrammatically shows an isometric view of the coupling mechanism of a drive unit in accordance with a seventh exemplary embodiment of the present invention, FIG. 13A diagrammatically shows an isometric view of one exemplary embodiment of the drive unit according to the invention for the drive of four functions (actuating or throttle flaps), FIG. 13B diagrammatically shows an isometric, partially sectioned view of the embodiment of the drive unit according to the invention in accordance with FIG. 13A in the installed state, in which the throttle or closing flaps which can be actuated independently of one another with the aid of the drive unit, are arranged in an air duct system between an air conditioning system and a multiplicity of air vents, FIG. 14A diagrammatically shows an isometric view of the coupling mechanism of a drive unit in accordance with the seventh exemplary embodiment of the present invention from another observation direction, FIG. 14B diagrammatically shows an isometric view of the coupling mechanism of a drive unit in accordance with the seventh exemplary embodiment of the present invention from a further observation direction, to be precise without an eccentric cam, FIG. 15 diagrammatically shows a partially sectioned side view of an eighth exemplary embodiment of a drive unit according to the invention, FIG. 16 diagrammatically shows an isometric view of a restoring mechanism of a drive unit in accordance with a ninth exemplary embodiment of the present invention, FIG. 17 diagrammatically shows a partially sectioned, isometric view of a tenth exemplary embodiment of a drive unit according to the invention, FIG. 18 diagrammatically shows a partially sectioned, isometric view of an eleventh exemplary embodiment of a drive unit in an air vent of an air vent system according to the invention, FIG. 19 diagrammatically shows a sectioned plan view of one exemplary embodiment of a control element of the drive unit according to the invention, and FIG. 20 diagrammatically shows a sectioned plan view of a further exemplary embodiment of a control element of the drive unit according to the invention.

FIG. 1 diagrammatically shows a partially sectioned isometric view of one exemplary embodiment of the air vent system 100 according to the invention. The air vent system 100 has two air vents 101 which are arranged next to one another, and a drive unit 1 which is common with regard to the two air vents 101 of the air vent system 100 and is configured to actuate different functions of the two air vents 101 of the air vent system 100 as required.

As shown in FIG. 1, each air vent 101 of the air vent system 100 can have a housing with an air inlet region and an air outlet region which lies opposite, a housing wall of the housing delimiting, at least in regions, an air duct for air which flows from the air inlet region to the air outlet region along a main flow direction.

Various air guiding elements which direct the air flow and regulate the air flow are provided as louver assemblies in the air duct of each air vent 101. Here, the air guiding elements which are arranged further upstream (as viewed in the main flow direction) in the air duct of each air vent 101 in the case of the embodiment which is shown diagrammatically in FIG. 1 serve to deflect an air flow which flows through the air vent 101 as required in a first direction, whereas the air guiding elements which are provided further downstream serve to deflect the air flow which flows through the air vent 101 as required in a second direction which runs perpendicularly with respect to the first direction.

Although it is not shown in FIG. 1, it is fundamentally also conceivable, however, if each air vent 101 is also given additional functions. For example, each air vent 101 can be provided with a separate throttle and/or closure flap, in order to regulate as required the air quantity which flows through the air duct of the air vent 101 per unit time, or in order to block the air duct of the air vent 101 completely as required, or in order to extend a decorative flap in front of the air vent as required, in order thus to conceal the air vent when the latter is not being used.

Therefore, each air vent 101 of the air vent system 100 which is shown diagrammatically in FIG. 1 has at least two functions which can correspondingly be actuated independently of one another. The total number of functions which can be actuated independently of one another of the overall air vent system 100 therefore adds up to at least four functions.

In order for it to be possible for said multiplicity of functions of the air vent system 100 to be actuated independently of one another and in order for it to be possible for the corresponding actuating members which bring about said functions to be driven, the air vent system 100 has a drive unit 1 which, in the case of the exemplary embodiment which is shown in FIG. 1, is arranged in an intermediate space between the two adjacently arranged air vents 101.

Exemplary embodiments of the drive unit 1 which is used in the case of the air vent system 100 in accordance with FIG. 1 for actuating the different functions of the two air vents 101 of the air vent system 100 as required will be described in greater detail in the following text with reference to the illustrations in FIGS. 2 to 6.

It is to be noted at this point that the construction and the method of operation of the drive unit 1 cannot be seen or at least cannot be seen completely on the basis of the illustration in FIG. 1, since, in FIG. 1, the drive unit 1 is provided with a corresponding housing 2, in which at least some components of the drive unit 1 are received.

Figure 2:
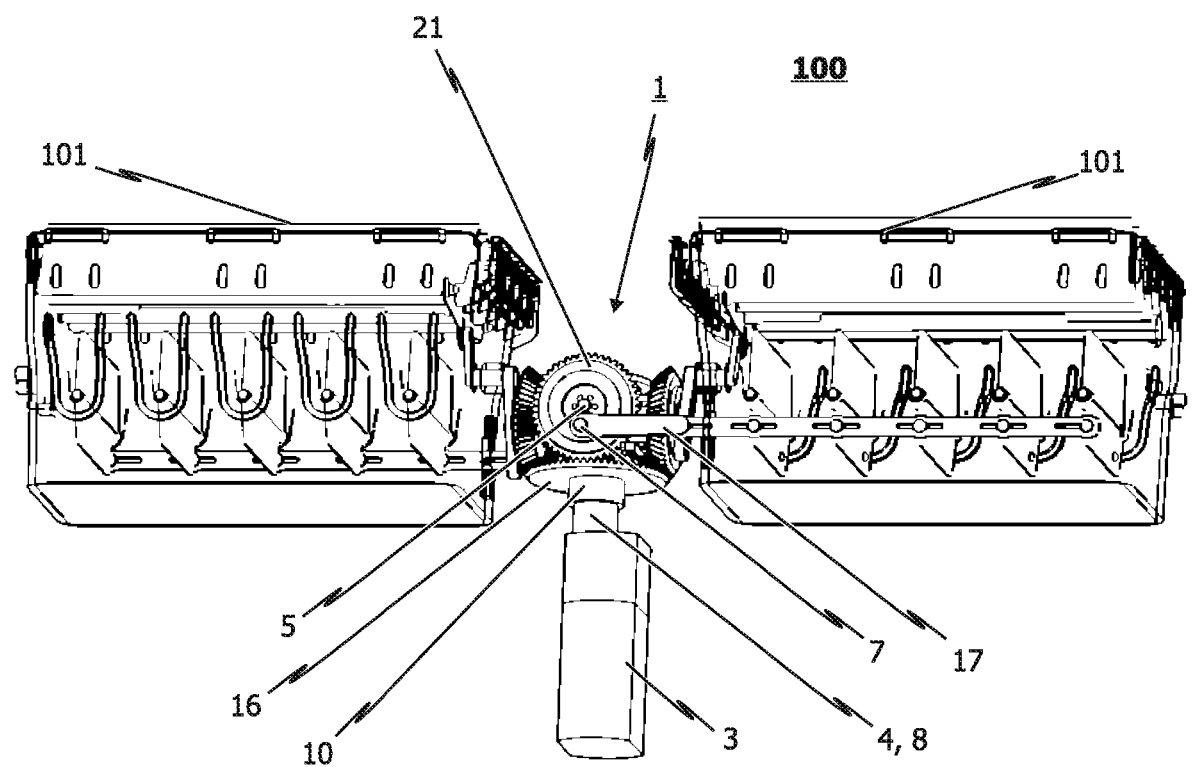

In contrast, FIG. 2 shows a diagrammatic, partially sectioned and isometric view of one exemplary embodiment of a drive unit 1 which is suitable, in particular, for use in the case of an air vent system 100 in accordance with FIG. 1, in order to actuate different functions of the air vents 101 of the air vent system 100 as required.

In contrast to the illustration in FIG. 1, FIG. 2 shows the drive unit 1 without a corresponding housing 2, with the result that further details of the drive unit 1 can be seen, at least in a structural regard.

Figure 3:
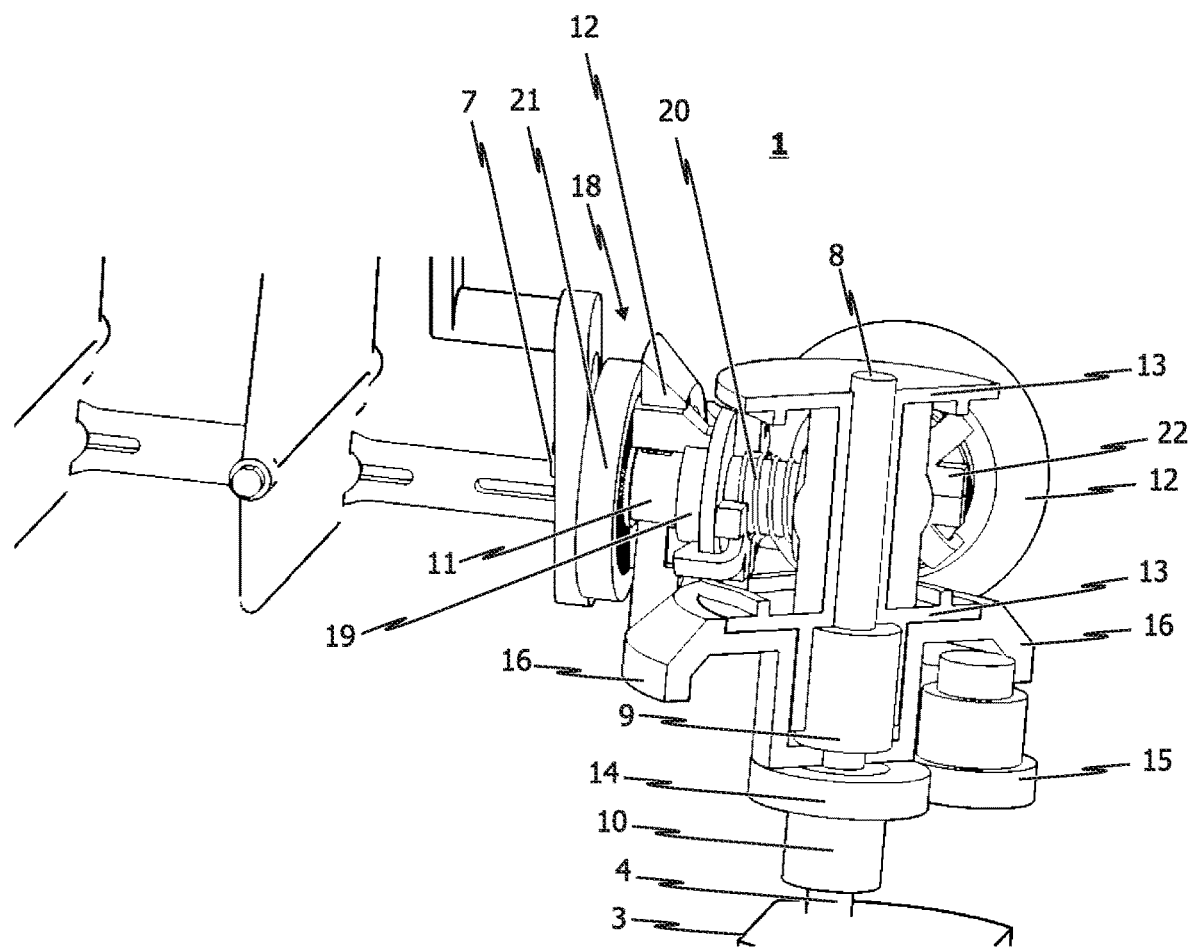

FIG. 3 diagrammatically shows a partially sectioned, isometric detailed view of one exemplary embodiment of a drive unit 1 for an air vent system 100, as shown diagrammatically in FIG. 1, for example. The construction and the method of operation of the drive unit 1 which is shown in a partially sectioned detailed view in FIG. 3 correspond in substantial points to the structure and the method of operation of the drive unit 1 in accordance with FIG. 2, with the result that the two exemplary embodiments of the drive unit 1 will be described in greater detail in the following text.

In detail, the drive unit 1 in accordance with exemplary embodiments which are shown in diagrammatic illustrations in FIG. 2 and FIG. 3 has a (single) electric motor drive 3 in the form of an electric motor with a drive shaft 4 which can be driven as required in a first rotational direction or in a second rotational direction which is opposed to the first rotational direction.

As can be gathered, in particular, from the detailed view in FIG. 3, the drive unit 1 has, furthermore, a switching mechanism which is assigned to the drive shaft 4 of the electric motor drive 3, said switching mechanism having a multiplicity of (here, precisely four) output gears 21.

In the partially sectioned view in accordance with FIG. 3, only a first output gear 21 of the total of four output gears can be seen clearly on account of the partially sectioned illustration, a second output gear being concealed by a distribution gear 12, and the two last output gears not being shown on account of the sectional illustration.

In each case one function of the air vent system 100 can be actuated via each output gear 21 of the switching mechanism. Said function is, for example, adjusting as required of air guiding elements in one of the total of two air vents 101 of the air vent system 100 which are provided for the vertical or horizontal deflection of air.

Figure 4:
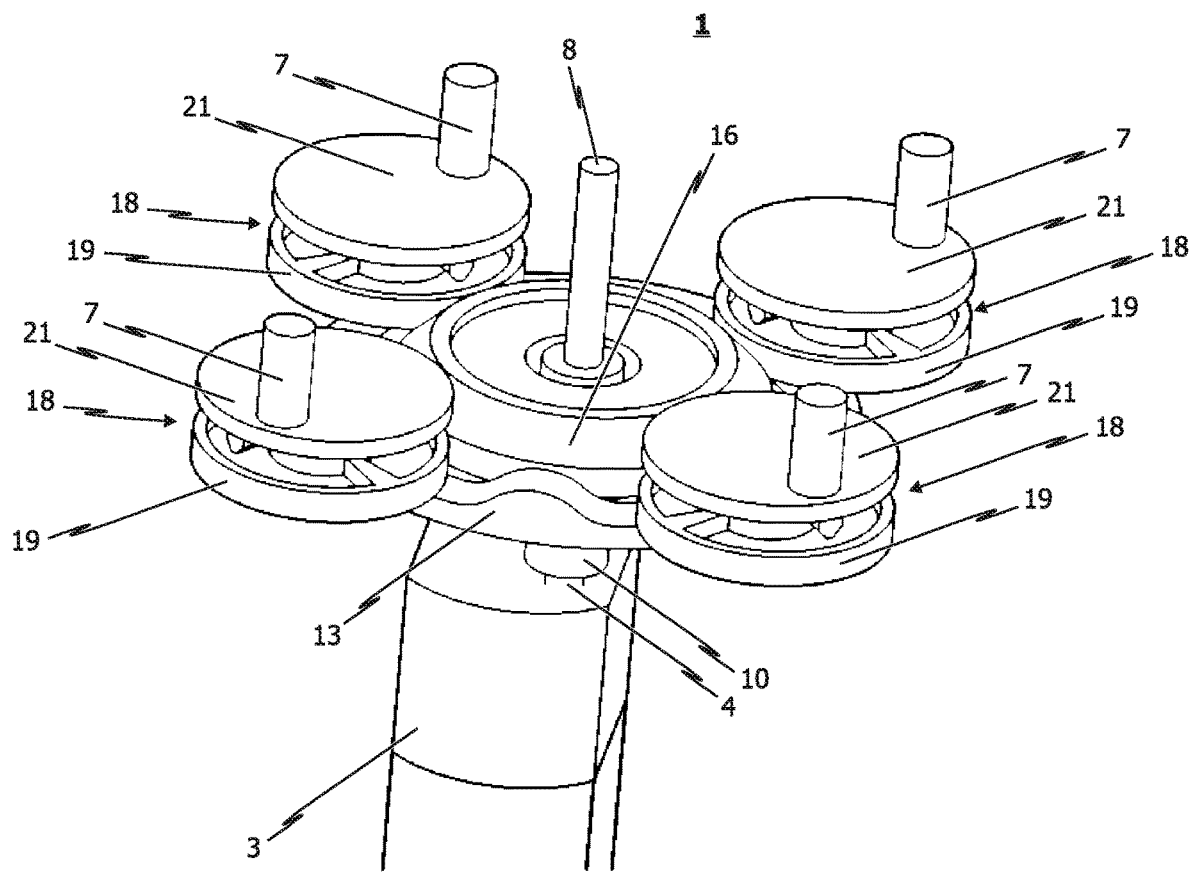

As can be gathered, for example, from the view in FIG. 2 and in FIG. 4, it is conceivable to this end that each output gear 21 of the switching mechanism has a pin 7, the center point of which lies outside the shaft axis of the output gear 21.

By way of an eccentric which is formed in this way, a rotary (rotational) movement of the output gear 21 of the switching mechanism can be converted into a translational (longitudinal) movement, it being possible for said translational movement to be transmitted by means of at least one coupling rod 17 to the actuating members to be manipulated of the corresponding air vent 101, in order to adjust or to manipulate the actuating members as required.

It goes without saying, however, that other embodiments are also conceivable, by way of which a rotational movement of the corresponding output gear 21 of the switching mechanism can optionally be converted, in order to bring about the corresponding function in the air vent 101 or air vent system 100.

In the case of the exemplary embodiment of the drive unit 1 according to the invention, as shown diagrammatically, for example, in FIG. 2 or in FIG. 3, the switching mechanism is configured, in particular, in the case of a drive of the drive shaft 4 of the electric motor drive 3 in a first rotational direction, to couple one (and, in particular, precisely one) of the total of four output gears 21 of the switching mechanism to the drive shaft 4 of the electric motor drive 3 or to couple it to an input shaft 8 of the switching mechanism.

Here, said input shaft 8 of the switching mechanism can either be configured as an extension of the drive shaft 4 of the electric motor drive 3, or the input shaft 8 of the switching mechanism can be connected, for example, via a gear mechanism to the drive shaft 4 of the electric motor drive 3.

Furthermore, the switching mechanism is configured, in the case of a drive of the drive shaft 4 of the electric motor drive 3 in the first rotational direction, to optionally decouple the other output gears 21 of the switching mechanism from the input shaft 8 of the switching mechanism or the drive shaft 4 of the electric motor drive 3.

Secondly, the switching mechanism which is used in the case of the drive unit 1 which is shown diagrammatically, for example, in FIG. 2 or in FIG. 3 is configured, in the case of a drive of the drive shaft 4 of the electric motor drive 3 in a second rotational direction which is opposed to the first rotational direction, to transmit a torque from the drive shaft 4 of the electric motor drive 3 (optionally via the input shaft 8 of the switching mechanism) to (and, in particular, exclusively only to) that output gear 21 of the switching mechanism which is coupled to the input shaft 8 of the switching mechanism or to the drive shaft 4 of the electric motor drive 3.

In order to achieve said functionality, in the case of the drive unit 1 which is shown diagrammatically, for example, in FIG. 2 or in FIG. 3, the switching mechanism is configured as a distribution gear mechanism which is assigned the first, second, third and fourth output gear 21. As has already been stated, in each case one function of the air vent system 100 can be actuated via the respective output gear 21 of the switching mechanism which is configured as a distribution gear mechanism.

The distribution gear mechanism is configured specifically to selectively transmit a torque from the drive shaft 4 of the electric motor drive 3 to precisely one output gear of the total of four output gears 21 of the distribution gear mechanism.

To this end, the distribution gear mechanism is configured, in the case of a drive of the drive shaft 4 in the first rotational direction, to couple one output gear of the total of four output gears 21 to the input shaft 8 of the distribution gear mechanism or directly to the drive shaft 4 of the electric motor drive, and to decouple the other output gears 21 of the distribution gear mechanism from the input shaft 8 of the distribution gear mechanism or from the drive shaft 4 of the electric motor drive.

In the case of a drive of the drive shaft 4 of the electric motor drive 3 in the second rotational direction which is opposed to the first rotational direction, in contrast, a torque is transmitted from the drive shaft 4 of the electric motor drive 3 (optionally via the input shaft 8 of the distribution gear mechanism) to that output gear 21 of the distribution gear mechanism which is coupled to the input shaft 8 of the distribution gear mechanism or to that output gear 21 of the distribution gear mechanism which is coupled to the drive shaft 4 of the electric motor drive 3.

It is provided here that the distribution gear mechanism has a control mechanism which is connected via a first freewheel 9 to the input shaft 8 of the distribution gear mechanism or to the drive shaft 4 of the electric motor drive in such a way that, only (and, in particular, exclusively only) in the case of a drive of the drive shaft 4 of the electric motor drive in the first rotational direction, a torque is transmitted from the drive shaft 4 of the electric motor drive to the control mechanism.

In the case of the exemplary embodiment of the drive unit 1 according to the invention, as shown diagrammatically in FIG. 2 and in FIG. 3, the distribution gear mechanism has a distribution mechanism which is connected via a second freewheel 10 to the input shaft 8 of the distribution gear mechanism or to the drive shaft 4 of the electric motor drive in such a way that, only (and, in particular exclusively only) in the case of a drive of the drive shaft 4 of the electric motor drive 3 in the second rotational direction (that is to say, in the opposed rotational direction to the first rotational direction), a torque is transmitted from the drive shaft 4 of the electric motor drive 3 to the distribution mechanism.

As can be gathered, in particular, from the partially sectioned detailed view in FIG. 3, the distribution mechanism of the drive unit 1 has a correspondingly associated distribution axle 11 for each of the (here, a total of four) output gears 21 of the distribution gear mechanism, via which distribution axle 11 a distribution gear 12 is mounted rotatably. It is provided here that, only (and, in particular, exclusively only) in the case of a drive of the drive shaft 4 of the electric motor drive 3 in the second rotational direction, a rotational movement is transmitted in each case from the drive shaft 4 of the electric motor drive 3 or the input shaft 8 of the distribution gear mechanism to the individual distribution gears 12.

Furthermore, it is provided in the case of the exemplary embodiment of the drive unit 1 according to the invention that (as can be gathered, in particular, from the partially sectioned view in FIG. 3) the distribution gear mechanism has a corresponding coupling mechanism 18 for each distribution gear 12, via which coupling mechanism 18 the corresponding distribution gear 12 can be coupled as required to the associated output gear 21 of the distribution gear mechanism.

In the case of the embodiment which is shown in FIG. 3, the coupling mechanism 18, via which a distribution gear 12 can be coupled as required to the associated output gear 21 of the distribution gear mechanism, is configured to couple the corresponding distribution gear 12 to the associated output gear 21 of the distribution gear mechanism as required via a frictionally locking toothing system.

As an alternative or in addition to this, however, it is also conceivable that the coupling mechanism 18 is configured to couple the corresponding distribution gear 12 to the associated output gear 21 of the distribution gear mechanism as required via a frictionally locking connection or a positively locking connection or a combination thereof.

In this context, reference is to be made to the illustration in FIG. 2 and FIG. 3, on the basis of which it can be seen that a coupling mechanism 18 is used here, in the case of which the corresponding distribution gear 12 is coupled to the associated output gear 21 of the distribution gear mechanism as required via a positively locking connection. For this purpose, via a contour of at least one control element 13, an actuating plate or tension plate 22 can couple or decouple a corresponding switching collar 19, and therefore also a corresponding distribution gear 12, counter to a force of a compression spring 20 to/from the corresponding output gear 21 via toothing systems, in particular frictionally locking toothing systems (or frictional pairing), which are situated on the two elements, the switching collar 19 and the output gear 21. As an alternative to this, however, it would also be possible that the toothing system (or frictional pairing) of the distribution gears 12 are brought out of engagement, as shown, for example, in FIG. 8, 15 or 16.

In the case of the embodiment which is shown, in particular, in FIG. 3, the control mechanism of the distribution gear mechanism has at least one control element 13 (and, here, precisely two control elements 13 which interact with one another), which control mechanism is connected via the first freewheel 9 to the input shaft 8 of the distribution gear mechanism or the drive shaft 4 of the electric motor drive in such a way that, only in the case of a drive of the drive shaft 4 of the electric motor drive 3 in the first rotational direction, a torque is transmitted from the drive shaft 4 of the electric motor drive 3 to the control mechanism.

In the case of the exemplary embodiment in accordance with FIG. 3, said control element 13 is configured in the form of cam plates (upper and lower cam plates).

In the case of a drive of the drive shaft 4 of the electric motor drive 3 in the first rotational direction, the at least one control element 13 which can also be configured as a cam disk or slotted guide, however, can be actuated, in order to selectively couple a corresponding distribution gear 12 to the correspondingly associated output gear 21 of the distribution gear mechanism.

Here, in detail, the control element 13 (for example, the cam plate arrangement consisting of upper and lower cam plates) is configured, in the case of a drive 3 of the electric motor drive 3 in the first rotational direction, to be rotated relative to the distribution axles 11 or distribution gears 12 about a rotational axis, and to couple the distribution gears 12 to the correspondingly associated output gear 21 of the distribution gear mechanism in a manner which is dependent on a rotational angle.

In the case of the embodiment which is shown, for example, in FIG. 3, the distribution mechanism of the distribution gear mechanism has a first gearwheel 14 which is connected via the second freewheel 10 to the input shaft 8 of the distribution gear mechanism or the drive 3 of the electric motor drive in such a way that, only in the case of a drive of the drive shaft 4 of the electric motor drive in the second rotational direction, said first gearwheel 14 rotates correspondingly and drives a second gearwheel 15 correspondingly.

The second gearwheel is in turn connected to a bevel gear 16, in order to transmit a torque of the first gearwheel 14 to the bevel gear 16. Via a bevel toothing system, the bevel gear 16 drives the individual distribution gears 12 of the distribution axles 11, which distribution gears 12 are likewise configured as bevel gears, for example.

As shown in FIG. 3, the coupling mechanism 18, via which the corresponding distribution axles 11 or distribution gears 12 which can be configured, for example, in each case as a bevel gear can be coupled as required to the associated output gear 21, can have a corresponding switching collar 19 per distribution shaft 11 or distribution gear 12, pins of the switching collar 19 plugging into guides of the distributed gear 12.

Said pins can have a frictionally locking toothing system which, in the case of pressing by way of the compression spring 20, transmit the rotation of the distribution gear 12 which is configured, in particular, as a bevel gear to the correspondingly associated output gear 21 of the distribution gear mechanism.

To this end, a corresponding pin wheel can be provided on the corresponding output gear 21 of the distribution gear mechanism, as indicated in FIG. 3.

In detail, it is provided in the case of the embodiment which is shown in FIG. 3 that the compression spring 20 presses the corresponding switching collar 19 with the frictionally locking toothing system into a frictionally locking toothing system of the pin wheel 21 via the actuating plate or tension plate 22.

Here, that control element 13 of the control mechanism which is configured as an upper and lower cam plate in the case of the embodiment which is shown in FIG. 3 is configured in such a way that the cam plates withdraw the switching collars 19 via lugs on the actuating plate 22 when the cam plates rotate further, in order to enable another function.

It is to be noted at this point that the present invention is not restricted to the specific construction of the drive unit 1, as shown in FIG. 3. Rather, spur gears can also be used instead of bevel gears; the cam drive is then to be adapted accordingly. Reference is made in this context to the illustration in FIG. 4.

It is also conceivable that the cam drive acts in a pressing manner against a withdrawing spring 20, or a normal positively locking connection (pin in cutout) or a frictionally locking connection transmits the rotation.

Figure 11:
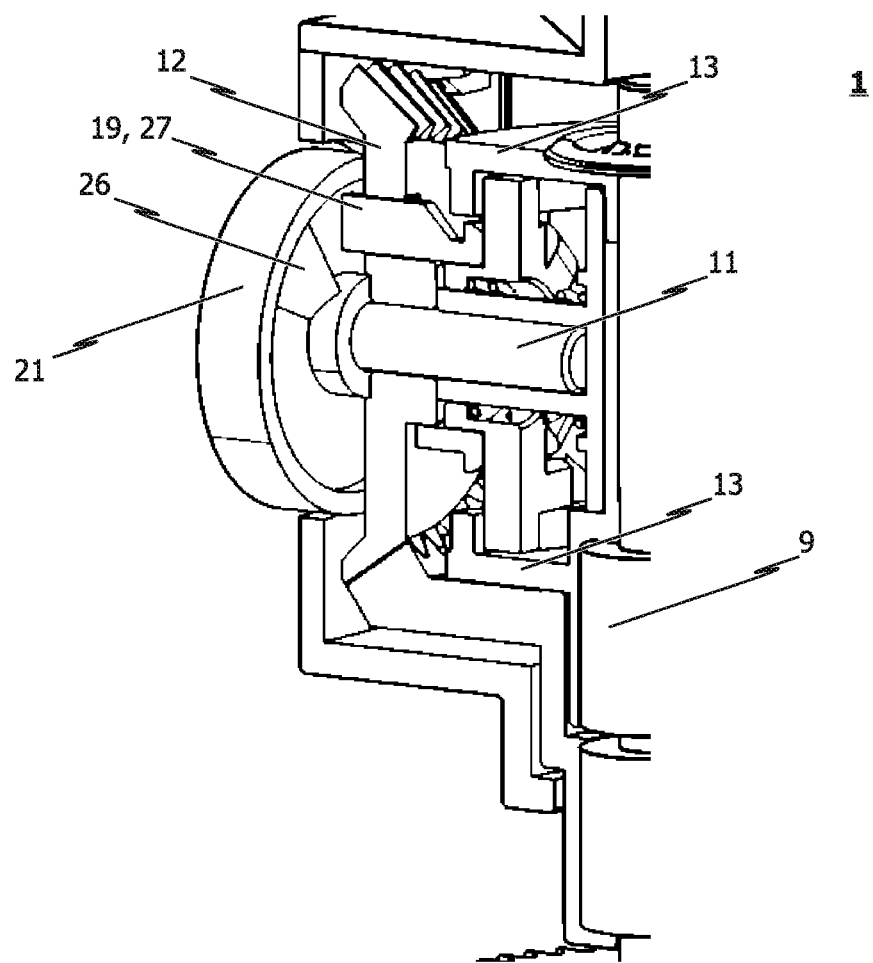

In the case of a pin-in-cutout solution, as shown in FIG. 11, for example, the pin drives only in one position by way of only one pin in only one cutout. Since the pin does not run backward, the position of the pin wheel 21 can be extrapolated from the pin position.

If the distribution gears 12 have a suitable transmission ratio with respect to the bevel gear 16, it can then be determined by way of a position sensor on the bevel gear 16, into which position the function which is currently coupled is being moved, without it being necessary for a sensor to be attached to each pin wheel 21 or further elements of the respective function.

In the following text, a further exemplary embodiment of the drive unit 1 according to the invention will be described with reference to the illustration in FIGS. 5 and 6.

Figure 5:
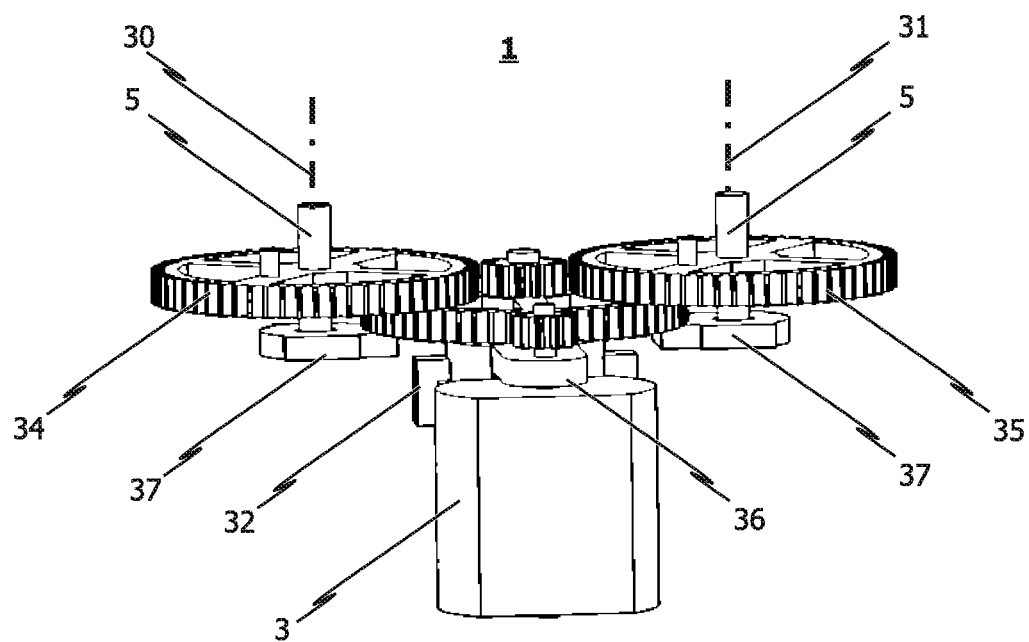
Figure 6:
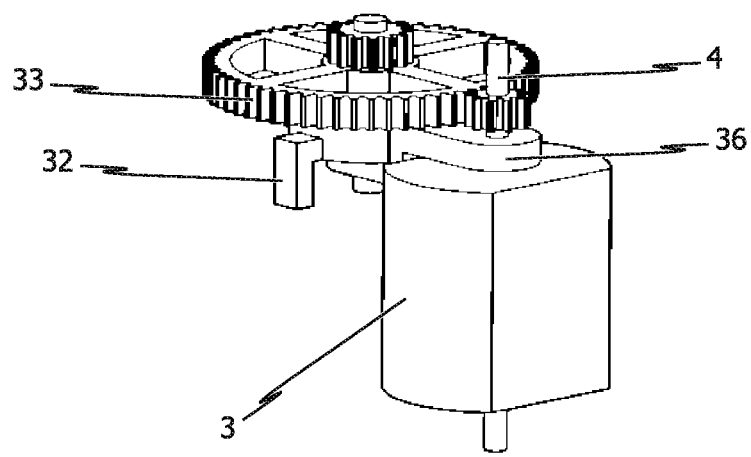

The drive unit 1 which is shown in FIGS. 5 and 6 serves to actuate two independent functions of an air vent system 100, it being possible for this to directly mean functions of the air vent 101, such as drive of the horizontal louvers and drive of the vertical louvers, or else the drive of a switching function which corresponds to the above description.

The drive unit 1 has an electric motor drive 3 with a drive shaft 4 which can be driven as required in a first rotational direction or in a second rotational direction which is opposed to said first rotational direction. It is provided here that the drive unit 1 has a switching mechanism which is assigned to the drive shaft 4, with a first and a second output shaft 5, via which in each case one function of the air vent system 100 can be actuated.

The switching mechanism is configured, in particular, in the case of a drive of the drive shaft 4 in the first rotational direction, to transmit a torque from the drive shaft 4 only to the first output shaft 5, and, in the case of a drive of the drive shaft 4 in the second rotational direction, to transmit a torque from the drive shaft 4 only to the second output shaft 5.

The switching mechanism of the drive unit 1 in accordance with FIG. 5 and FIG. 6 is distinguished by the fact that it is constructed without corresponding freewheels. Rather, a mechanical actuating element 32, in particular in the form of a brake, is used which is assigned to the drive shaft 4 of the electric motor drive 3 and is designed, in the case of a drive of the drive shaft 4 in the first rotational direction, to move, in particular to pivot, the drive shaft 4 or a first clutch plate 33 which is connected to the drive shaft 4 in the direction of the first output shaft 5 relative to the first output shaft 5 or to a second clutch plate 34 which is connected to the first output shaft 5, in such a way that the drive shaft 4 of the electric motor drive 3 couples with the first output shaft 5.

Furthermore, the mechanical actuating element 32 which is configured, in particular, in the form of a brake, is configured, in the case of a drive of the drive shaft 4 of the electric motor drive in the second rotational direction, to move, in particular to pivot, the drive shaft 4 of the electric motor drive or a first clutch plate 33 which is connected to the drive shaft 4 of the electric motor drive in the direction of the second output shaft 5 relative to the second output shaft 5 or to a clutch plate 35 which is connected to the second output shaft 5, in such a way that the drive shaft 4 of the electric motor drive couples with the second output shaft 5.

As shown, the drive shaft 4 of the electric motor drive can be connected via a toothing system to the first clutch plate 33. Furthermore, it is preferred if the first clutch plate 33 can be connected in each case via a toothing system (or as an alternative via a frictionally locking connection) to the second or third clutch plate 34, 35, in order to couple the drive shaft 4 of the electric motor drive to the first or second output shaft 5 in a manner which is dependent on the rotational direction of the drive shaft 4 of the electric motor drive.

In detail, it is provided in the case of the embodiment which is shown in FIG. 5 and FIG. 6 that the electric motor drive 3 generates a corresponding torque in the case of the rotation of the drive shaft 4. Here, the electric motor drive 3 is supported on a housing (not shown in FIG. 5 or FIG. 6), in which the rotational axles 30, 31 of the second and third clutch plate 34, 35 are also mounted.

The mechanical actuating element 32 which is configured as a brake in the case of the embodiment which is shown removes a torque from the rotational axle of the first clutch plate 33 which is connected to the drive shaft 4 of the electric motor drive 3, and forwards said torque into a pivoting arm 36. As a consequence, the pivoting arm 36 rotates with the actuating element 32 (brake) and the first clutch plate 33 until the first clutch plate 33 couples either with the second or the third clutch plate 34, 35 or bears against the first or second clutch plate 34, 35, and therefore the torque of the actuating element 32 is supported.

Figure 7:
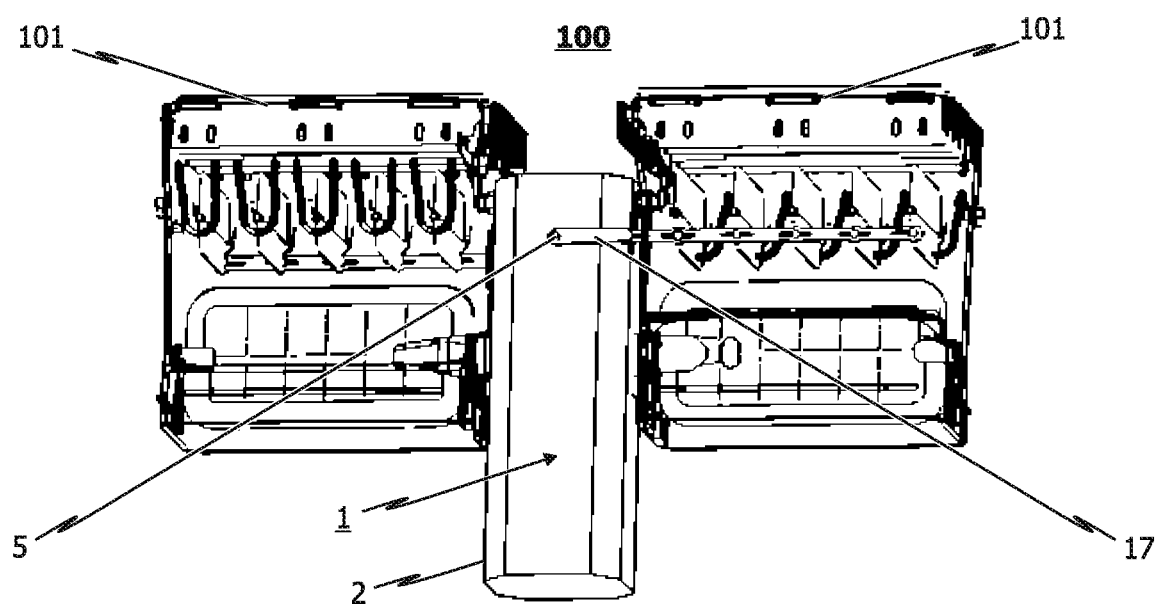

FIG. 7 shows one development of the air vent system 100 which is shown diagrammatically in FIG. 1. The development of the air vent 100 is distinguished, in particular, by the fact that the drive unit 1 does not merely have a single distribution gear mechanism, as has been described above, for example, with reference to the illustration in FIG. 3, but rather has a plurality of (in particular, two) distribution gear mechanisms which are arranged behind one another and via which yet further functions of the air vent system 100 can be actuated as required. An example for further functions of this type would be the adjusting of at least one throttle or closing flap or the adjusting of at least one decorative flap, a decorative flap concealing the at least one vent opening of the air vent 101 in the case of non-use of the air vent 101.

The invention is not restricted to the embodiments which are shown in the drawings, but rather results from a combination of all features disclosed herein.

In this context, it is conceivable, in particular, that at least one sensor 37, in particular a position sensor, is provided for the direct or indirect detection of a switching state of the distribution gear mechanism and/or a function of the air vent system 100, which function is actuated by the drive unit 1. The at least one sensor 37 is configured, in particular, such that it detects the position of the control element 13 (cam plate, cam disk).

In this context, reference is made, for example, to the illustration in FIG. 5. In the case of said exemplary embodiment, position sensors 37 are provided which detect the actually actuated position on the output side. In the case of said embodiment, this can be detected on the drive 3 itself only with relatively great errors/inaccuracies on the drive side on account of the play in the case of the change of the rotational direction of the electric motor drive 3. A blockage or manual adjusting can also be detected by way of the position sensors 37 which are provided on the output side.

Furthermore, it is conceivable to use the mechanism in accordance with FIG. 5 instead of the two freewheels 9, 10 which are used in the case of the mechanism which is shown in FIG. 3.

In the following text, a third exemplary embodiment of the drive unit 1 according to the invention will be described in greater detail with reference to the illustration in FIG. 8.

The third exemplary embodiment of the drive unit 1 according to the invention corresponds in principle in a structural and functional regard to the second exemplary embodiment which is shown in FIG. 3.

Figure 8:
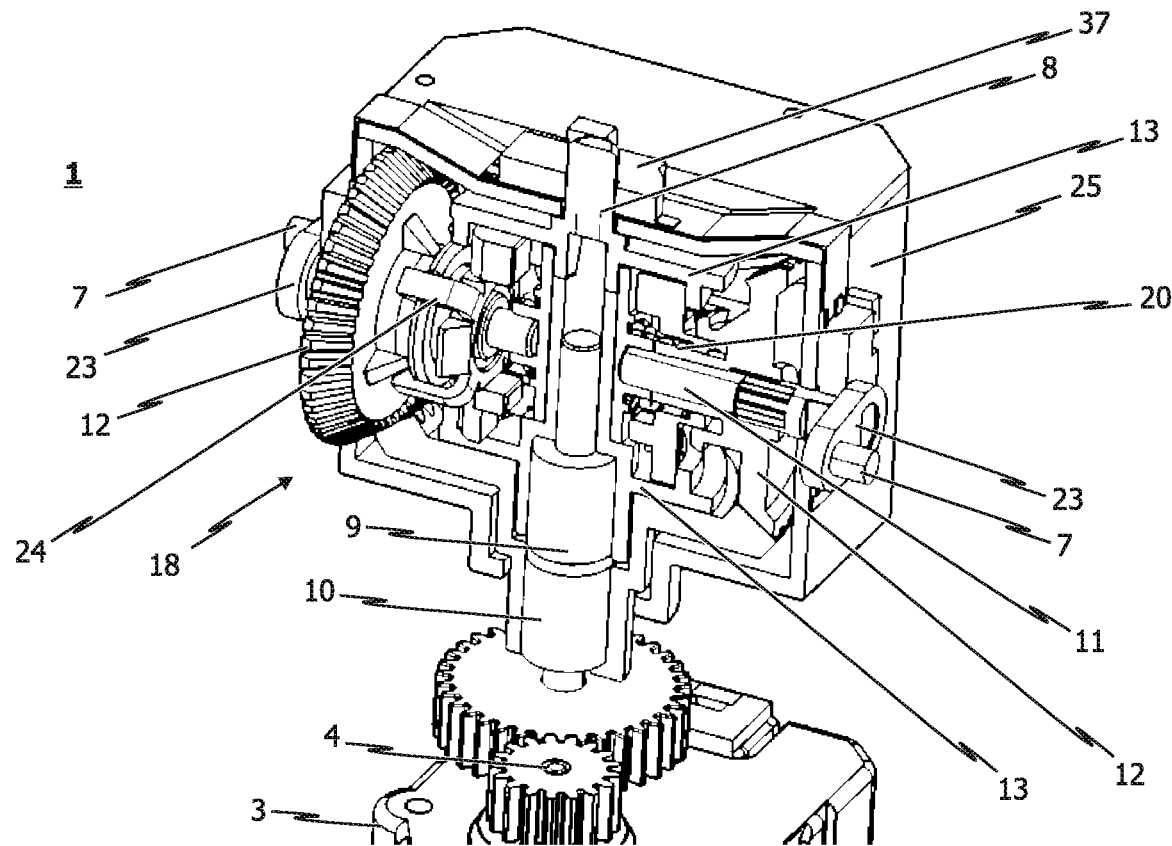

In detail, the drive unit 1 in accordance with the diagrammatic illustration in FIG. 8 has an electric motor drive 3 in the form of an electric motor with a drive shaft 4 which can be driven as required in a first rotational direction or in a second rotational direction which is opposed to the first rotational direction.

Furthermore, the drive unit 1 has a switching mechanism which is assigned to the drive shaft 4 of the electric motor drive 3, said switching mechanism, in contrast to the second exemplary embodiment of the drive unit 1 according to the invention in accordance with FIG. 3, not having any output gears, but rather levers 23 with pins 7. On account of the partially sectioned illustration in FIG. 8, only two levers 23 with pins 7 can be seen, the two other levers with pins not being shown on account of the sectional illustration.

In each case one function, for example, of an air vent system 100 can be actuated via each lever 23 of the switching mechanism, said function being, in particular, adjusting as required of air guiding elements which are provided for vertical or horizontal air deflection, or closing flaps. It is provided here, in particular, that the pin 7 which belongs to the lever 23 is arranged eccentrically with respect to the shaft axis of the lever 23. A rotational (rotary) movement of the lever 23 of the switching mechanism can be converted into a translational (longitudinal) movement by way of an eccentric which is formed in this way, it being possible for said translational movement to be transmitted via a coupling rod 17 (not shown in FIG. 8) to the actuating members to be manipulated of the corresponding air vent 101.

As also in the case of the second exemplary embodiment (shown in FIG. 3) of the drive unit 1 according to the invention, it is provided in the case of the third exemplary embodiment which is shown in FIG. 8 that the switching mechanism is configured, in the case of a drive of the drive shaft 4 of the electric motor drive 3 in a first rotational direction, to couple one (and, in particular, precisely one) of the total of four levers 23 of the switching mechanism to the drive shaft 4 of the electric motor drive 3.

Furthermore, the switching mechanism is configured, in the case of a drive of the drive shaft 4 of the electric motor drive 3 in the first rotational direction, to optionally decouple the other levers 23 of the switching mechanism from the drive shaft 4 of the electric motor drive 3.

Secondly, the switching mechanism which is used in the case of the drive unit 1 which is shown diagrammatically in FIG. 8 is configured, in the case of a drive of the drive shaft 4 of the electric motor drive 3 in a second rotational direction which is opposed to the first rotational direction, to transmit a torque or a rotational movement from the drive shaft 4 of the electric motor drive 3 to, and, in particular, exclusively only to, that lever 23 of the switching mechanism which is coupled to the drive shaft 4 of the electric motor drive 3.

In order to achieve said functionality, in the case of the drive unit 1 which is shown in FIG. 8, the switching mechanism is configured as a distribution gear mechanism which is assigned the first, second, third and fourth lever 23. In detail, the distribution gear mechanism is configured to selectively transmit a torque or a rotational movement from the drive shaft 4 of the electric motor drive to precisely one lever 23 of the total of four levers 23 of the distribution gear mechanism.

For this purpose, the distribution gear mechanism has a control mechanism which is connected via a first freewheel 9 to the drive shaft 4 of the electric motor drive 3 in such a way that, only (and, in particular, exclusively only) in the case of a drive of the drive shaft 4 of the electric motor drive 3 in the first rotational direction, a torque or a rotational movement is transmitted from the drive shaft 4 of the electric motor drive 3 to the control mechanism.

In the case of the exemplary embodiment of the drive unit 1 according to the invention in accordance with FIG. 8, furthermore, the distribution mechanism has a second freewheel 10 which is connected to the drive shaft 4 of the electric motor drive in such a way that, only (and, in particular, exclusively only) in the case of a drive of the drive shaft 4 of the electric motor drive 3 in the second rotational direction (that is to say, in the rotational direction which is opposed to the first rotational direction), a torque is transmitted from the drive shaft 4 of the electric motor drive 3 to the distribution mechanism.

In detail, the distribution mechanism of the drive unit 1 has a correspondingly associated distribution shaft 11 for each of the total of four levers 23 of the distribution gear mechanism. It is provided here that, only in the case of a drive of the drive shaft 4 of the electric motor drive 3 in the second rotational direction, a rotational movement is transmitted in each case from the drive shaft 4 of the electric motor drive 3 to the individual levers 23.

The third exemplary embodiment (shown diagrammatically in FIG. 8) of the drive unit 1 according to the invention differs, in particular, from the second exemplary embodiment of the drive unit 1 in accordance with FIG. 2 and FIG. 3 in that, in the case of the third exemplary embodiment in accordance with FIG. 8, the corresponding lever 23 is permanently coupled rotationally to the associated bevel gear 12 and, instead, the bevel gears 12 are coupled or decoupled to/from the bevel gear 16 as required.

In detail, in the case of the embodiment which is shown in FIG. 8, the coupling mechanism 18, via which a distribution gear 12 can be coupled as required to the bevel gear 16 of the distribution gear mechanism, is configured as a bevel gear with an integrated switching collar. Here, the bevel gear is displaced to and fro in the radial direction in relation to the drive shaft 4 via a tensioning member 24, a corresponding compression spring 20 and a control element 13 (upper and lower cam disk). In the case of said embodiment, the coupling and decoupling between the bevel gear 12 and the large bevel gear 16 takes place by a bevel toothing system being pushed into one another or apart from one another.

Instead of an involute toothing system of this type, fine frictionally locking toothing systems or a normal frictionally locking connection are possible on the bevel gears.

The third exemplary embodiment (shown diagrammatically in FIG. 8) of the drive unit according to the invention also differs from the second exemplary embodiment which is shown in FIG. 3, in particular, in that, in the case of the third exemplary embodiment, the switching mechanism is received in a housing 25, a sensor 37 being arranged on the housing 25. In detail, the sensor 37 is configured as an angle sensor which is arranged on the outside of the housing 25, in order to detect the position of the four pins 7 of the levers 23. In particular, it is conceivable that the sensors 37 are configured as corresponding potentiometers.

Figure 9:
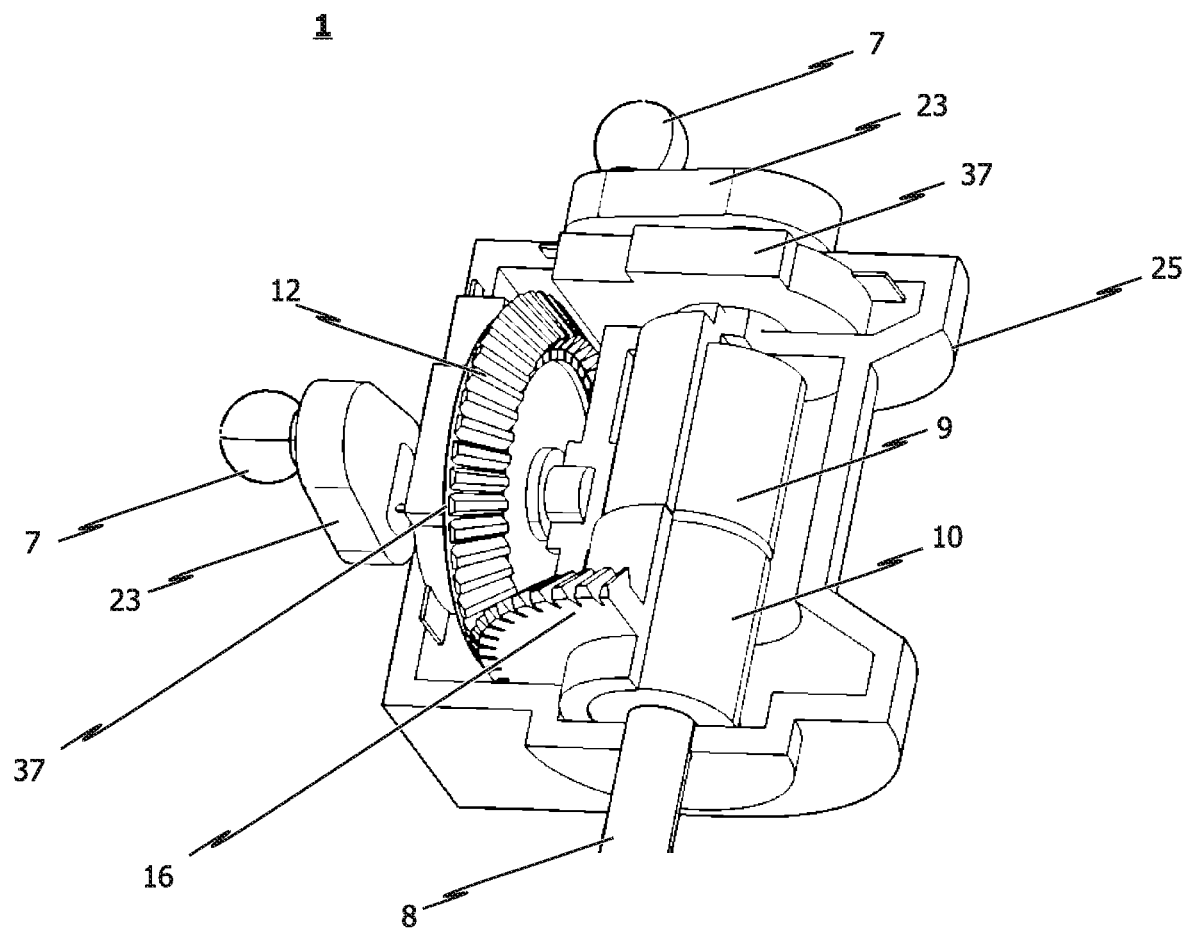

FIG. 9 diagrammatically shows a partially sectioned, isometric view of a fourth exemplary embodiment of a drive unit 1 according to the present invention. In the case of said design variant, the drive unit 1 serves to drive two functions.

Although not shown in FIG. 9, the drive unit 1 is assigned an electric motor drive, via which a corresponding drive shaft 4 can be driven. Moreover, the drive unit 1 has a switching mechanism with a first and a second freewheel 9, 10. In a manner which is dependent on the rotational direction of the drive shaft 4, a torque is transmitted via a bevel gear 16 to a distribution gear 12 which is assigned to a first lever 23 with pins 7 or a second lever 23 with pins 7.

Furthermore, it can be gathered from the illustration in FIG. 9 that, in the case of said design variant, a total of two potentiometers are provided as position sensors 37, in order to detect the position of the output shafts of the levers 23.

Figure 10:
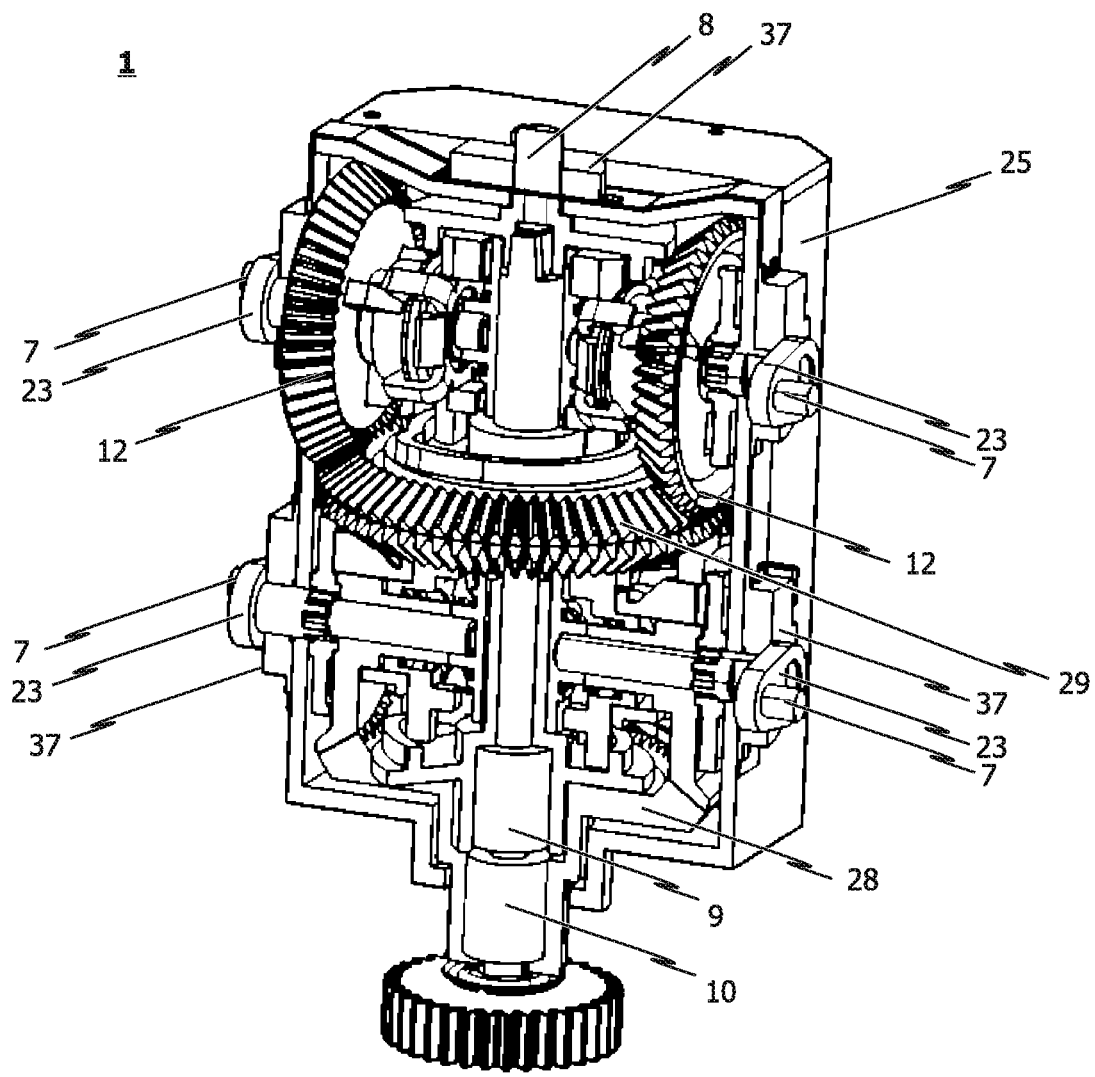

FIG. 10 diagrammatically shows a partially sectioned, isometric view of a fifth exemplary embodiment of the drive unit 1 according to the invention.

In the case of said embodiment, the drive unit serves for six or eight functions. To this end, an almost structurally identical drive unit, for example in accordance with the illustration in FIG. 8, is placed on top a second time.

It is provided here that the lower bevel gear 28 drives the upper distribution gears via a double-sided large bevel gear 29 which lies inbetween. The two upper cam disks (control element 13) are connected to one another through the bearing bore of the double-sided large bevel gear, and are therefore driven by the lower cam disks.

As shown in FIG. 10, the switching bulge of the upper cam disk is offset with respect to the other lower cam disk by 45°, with the result that the upper plane can be switched independently of the lower one.

On account of the partially sectioned illustration in FIG. 10, the output gears or levers 23 which point toward the front are not shown, and the levers 23 which point toward the rear are concealed by the housing 25 of the drive unit 1.

FIG. 11 diagrammatically shows a partially sectioned, isometric view of a region of a sixth exemplary embodiment of the drive unit 1 according to the present invention.

In detail, FIG. 11 shows one variant of the embodiment or the principle shown in FIG. 3, by way of which the switching collar 19 can be connected as required to the associated output gear 21. It is provided here that the driving between the switching collar 19 and the output gear 21 takes place (instead of via friction or toothing system) via a bearing face 26 on the circumference of the output gear 21 and a driver 27 on the switching collar 19.

In the case of an easily convertible transmission ratio (for example, 2:1 or 1:1), the position of all distribution or bevel gears 12 can be calculated by way of a single position sensor on the bevel gear 16. If the bevel gears 12 rotate by at least one complete revolution, the bearing face 26 on the coupled output gear 21 bears securely against a driver 27, and the position of the output gear 21 and therefore the position of the actuating member which is driven by way of it (not shown in FIG. 11) are therefore also known.

It is a precondition that it is known which output gear 21 is currently coupled, which can be realized, for example, with the aid of a position sensor which detects the position of the cam disk (control element 13).

In addition, it is advantageous to configure the side which lies opposite the bearing face 26 of the web on the output gear 21 as a ramp, in order that the spring-actuated switching collar 19 can slide via said ramp into the depression in a noiseless manner.

Figure 12:
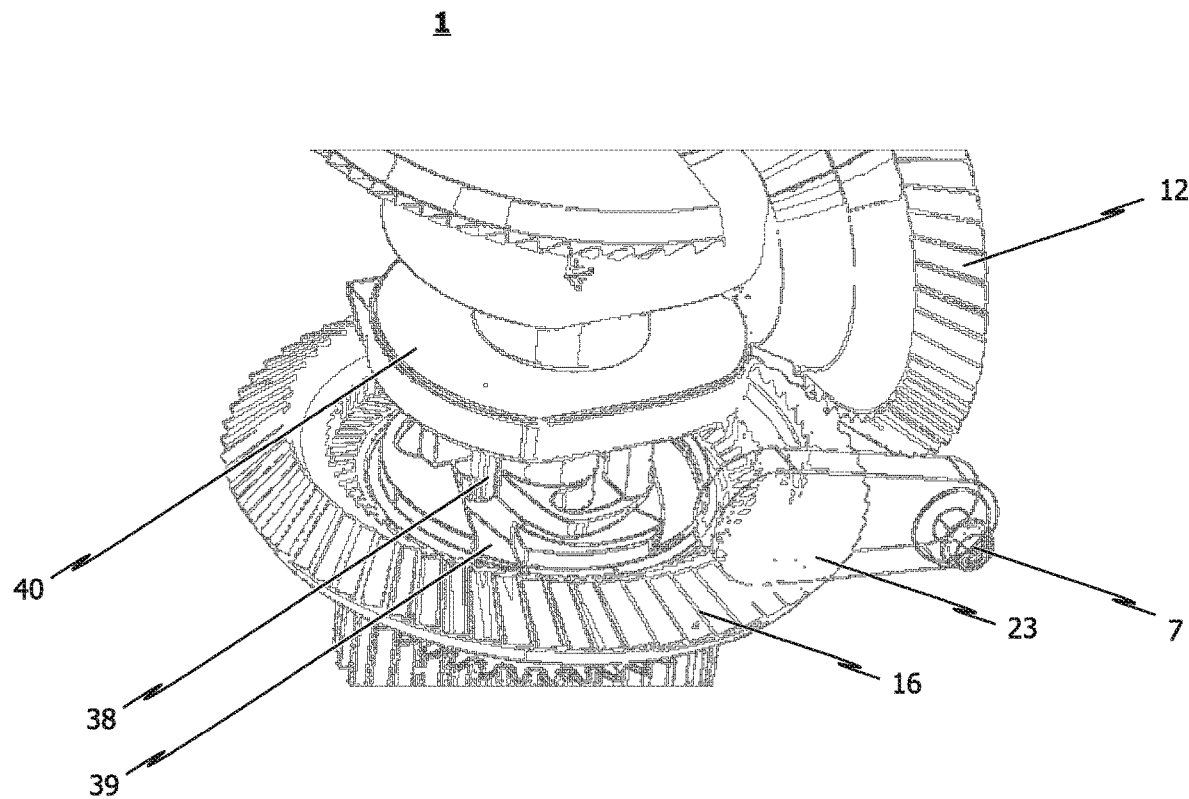

FIG. 12 diagrammatically shows an isometric view of the coupling mechanism of a drive unit 1 in accordance with a seventh exemplary embodiment of the present invention.

The drive unit 1 in accordance with the seventh exemplary embodiment is suitable, in particular, to switch or to drive a plurality of (for example, four) functions by way of one and the same electric motor drive. The coupling mechanism is not based on freewheels (first and second freewheels 9, 10) or related systems which separate the rotational directions, however, but rather a pin 38 is sent by cardioids or latching cams 39 by way of the two rotational directions of the electric motor drive 3 which is not shown explicitly in FIG. 12, with the result that, in the case of running up, a position is always selected first of all, and afterward either said function is operated or running up/switching is carried out again.

If the desire is to operate the same function which has already been set, running up/switching would be carried out three times and driving would be carried out only after the fourth run-up in the case of a four-function coupling mechanism.

In detail, it is provided in the case of the coupling mechanism in accordance with FIG. 12 that the pin 38 pivots toward the outside from the current position and in the process follows the cardioid 39. In the case of the run-up counter to the clockwise direction, the pin 38 runs on the inside past the left-hand driver and in the process, following the track, pivots somewhat toward the outside, where it comes into contact with the front driver after a 90° rotational angle and drives the latter with the eccentric cam 40 by 90°. The rotational direction is then reversed (in the clockwise direction). A step in the track of the cardioid 29 ensures that the pin 38 runs toward the outside via an inner contour of the bevel gear 16 which is configured as a gearwheel. Said contour is designed in such a way that the gearwheel (bevel gear 16) is not driven in said pulling direction (in the clockwise direction). If the rotational direction is reversed again here, the pin 38 presses into the toothing system of the bevel gear and drives the latter if this is desired at said time. Otherwise, it runs further in the clockwise direction (without a rotational direction reversal) and jumps back again into the inner track at the starting point at the next opportunity.

This can be repeated until the flattened point on the eccentric cam 40 brings the correct small bevel gear into engagement with the large bevel gear, and then, as described above, the pin 38 drives the large bevel gear counter to the clockwise direction before returning to the starting point.

Here, there are a second bevel gear and (concealed) a second mechanism at the top, such as the above-described mechanism, which drive both the two eccentric cams 40 and also, as required, the upper bevel gear, merely in the respectively reversed direction. This is possible because the pin 38 can rotate idly from the starting point on the inner track as far as 270°.

Figure 13A:
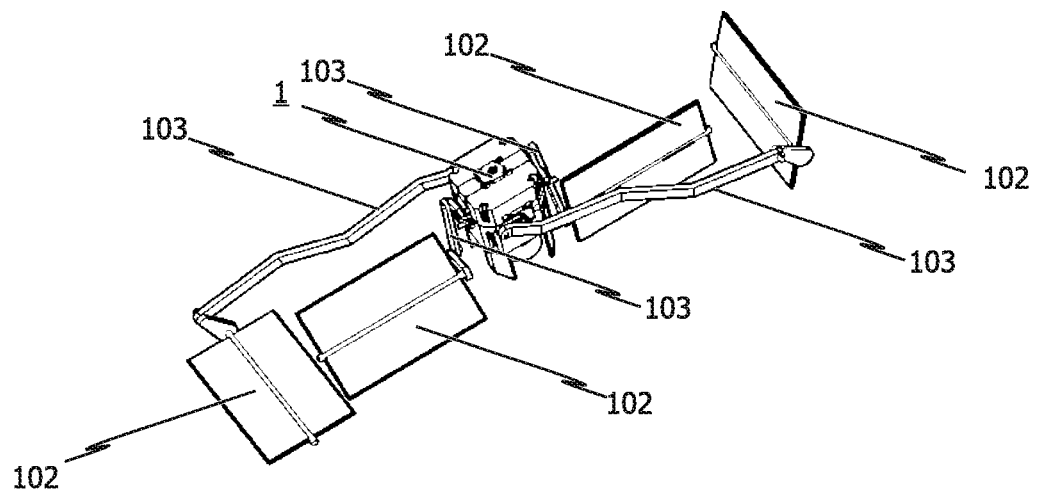

FIG. 13A diagrammatically shows an isometric view of one exemplary embodiment of the drive unit 1 according to the invention for driving four functions (actuating or throttle or closing flaps 102). As shown, the drive unit 1 comprises a total of four levers 23 which are connected via coupling rods to corresponding actuating or throttle flaps 102.

Figure 13B:
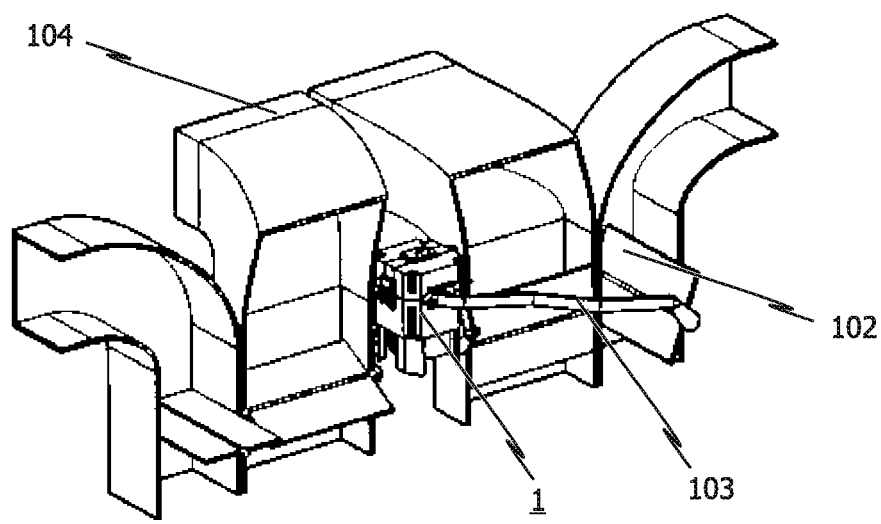

FIG. 13B diagrammatically shows an isometric, partially sectioned view of the exemplary embodiment of the drive unit 1 according to the invention in accordance with FIG. 13A in the installed state, in which the throttle or closing flaps 102 which can be actuated independently of one another with the aid of the drive unit 1 are arranged in an air duct system 104 between an air conditioning system (not shown in FIG. 13B) and a multiplicity of air vents (likewise not shown in FIG. 13B).

Figure 14A:
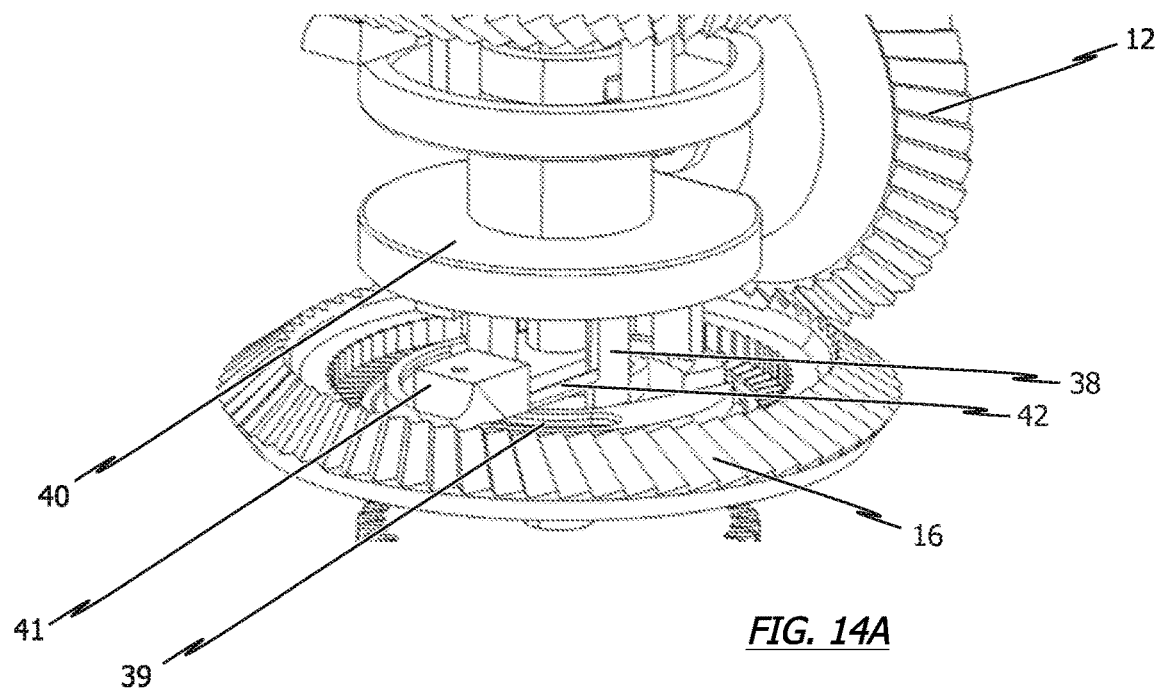
Figure 14B:
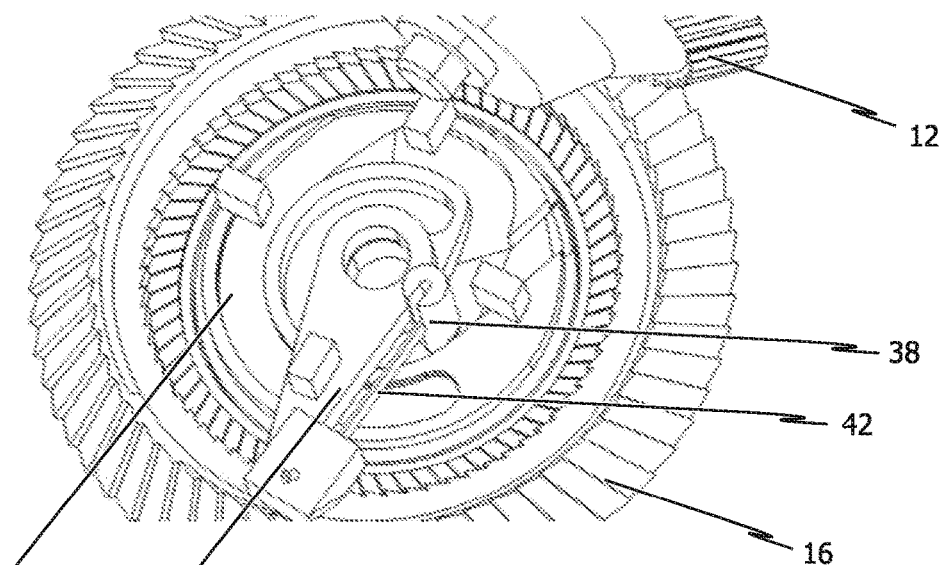

FIGS. 14A and 14B diagrammatically show an isometric view of the coupling mechanism (shown in FIG. 12) of a drive unit 1 in accordance with the seventh exemplary embodiment of the present invention from different observation directions, some of the elements of the coupling mechanism having been omitted in FIG. 14B for improved visibility. It is to be noted fundamentally that the eccentric cam 40 which has already been mentioned in FIG. 12 can also generally be called a cam disk and can correspond to the control element 13 which is described in the preceding embodiments. Furthermore, it can be said that, when the pin 38 which can also be a sliding block 38 drives the driver, the pin 38 is guided on a first radius, and, when the pin 38 presses into the toothing system of the bevel gear 16, the pin 38 is guided on a second radius. The pin 39 can change its position between said radii depending on the rotational direction, as described above. The gearwheel or bevel gear 16 which is mentioned in relation to FIG. 12 can fundamentally be called a drive gear 16 and is not restricted to an embodiment as a bevel gear, but rather can also assume other forms.

In addition to the pin 38 which is sent through cardioids, latching cams or slotted guide curves 39, a lever element 41 which drives said pin 38 is also shown here. Said lever element 41 can be driven in the two rotational directions by the electric motor drive 3 which is not shown explicitly in FIGS. 14A and 14B. An end of the lever element 41, which end lies remote from the drive axle 4 of the electric motor drive 3, is coupled to the pin 38 by means of a flexible or elastic connecting element 42. The flexible or elastic connecting element 42 is configured, in particular, from an elastically deformable metal, preferably from a spring steel. Via the coupling of the pin 38 and the lever element 41 by means of the flexible or elastic connecting element 42, it being possible for the pin 38 to move or to be moved relative to the lever element 42, the jumping back (described in relation to FIG. 12) of the pin 38 into the inner track at the starting point is considerably simplified, with the result that no external force or additional mechanism has to be provided for the movement of the pin into the inner track at the starting point.

Figure 15:
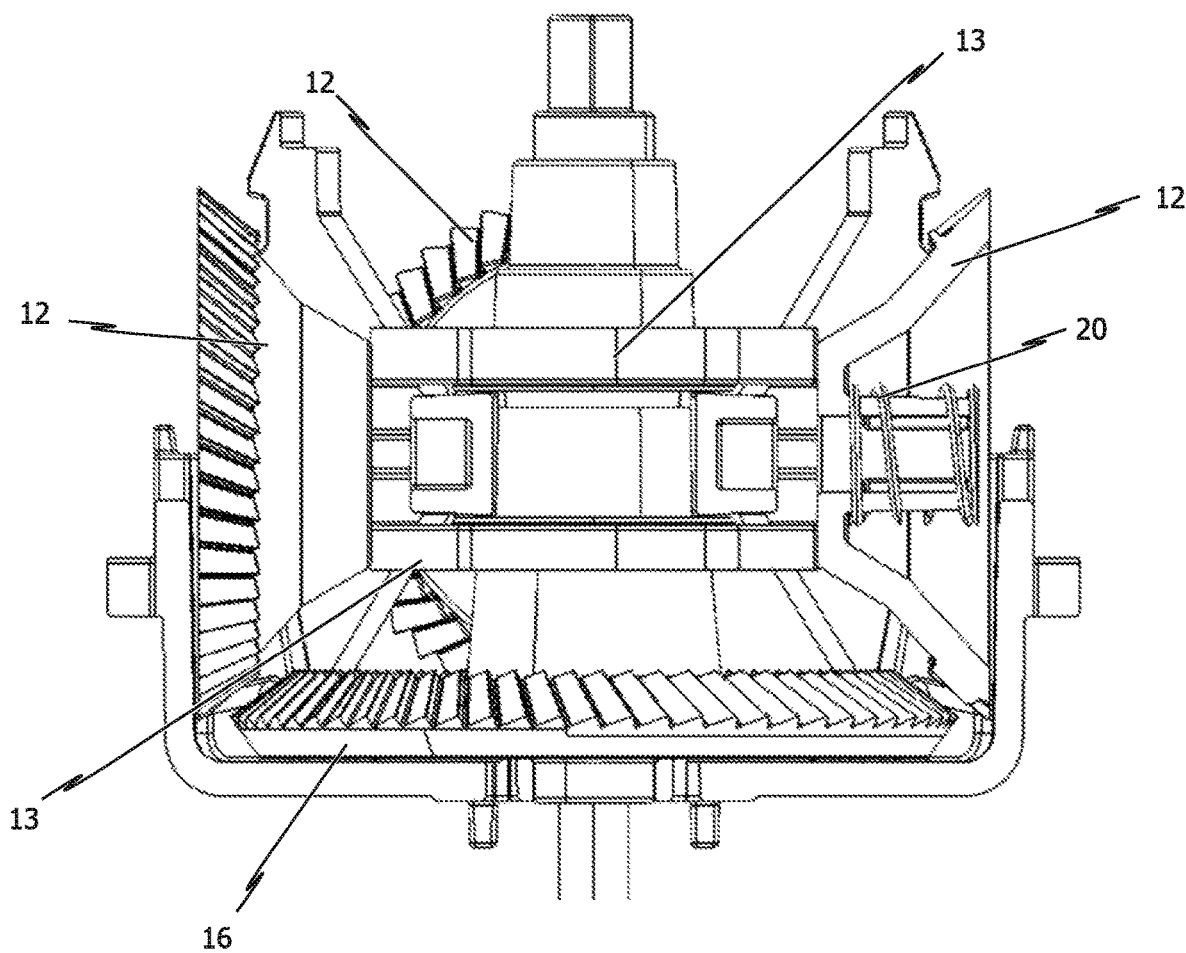

FIG. 15 diagrammatically shows a partially sectioned side view of an eighth embodiment of the drive unit according to the invention which is, in particular, a development of the embodiment or the principle from FIG. 8. Here, the actuating principle of the switching mechanism is reversed: the cam disks (control elements 13) press the distribution gears or bevel gears 12 toward the outside for decoupling from the large bevel gear 16, and springs 20 press the distribution gears or bevel gears 12 inward for coupling purposes. This has the advantage that jamming of the system or the drive unit is avoided if tooth and gap do not find one another in the case of a positive, form-guided coupling of the toothing system from FIG. 8, to be precise by virtue of the fact that a spring presses the toothing systems into one another and maintains said pressure until, in the case of a subsequent drive of the bevel gear 16, the toothing systems of the bevel gear 16 and the distribution gears or bevel gears 12 engage into one another.

Figure 16:
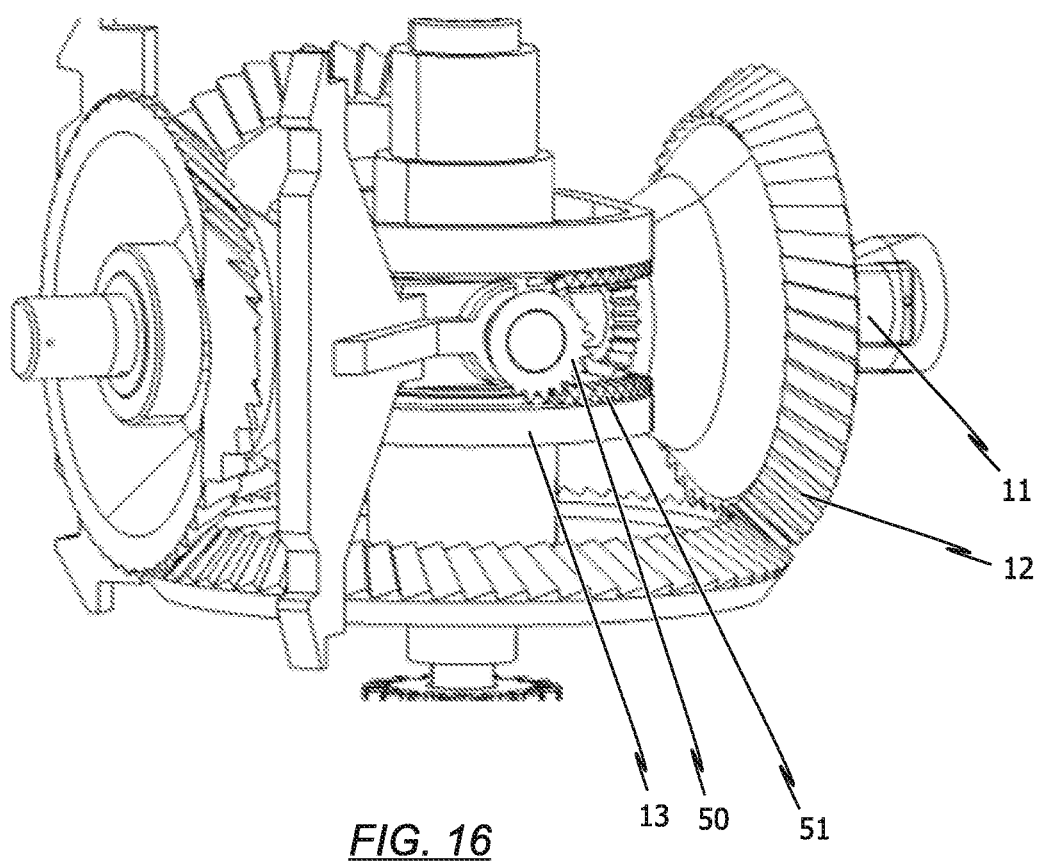

FIG. 16 diagrammatically shows an isometric view of a restoring mechanism of a drive unit 1 in accordance with an eighth exemplary embodiment of the present invention.

In the case of said embodiment, on their end face which faces the control element 13 of the control mechanism, the distribution gears 12 have an additional toothing system 50 which, in a state of the distribution gears 12 in which they are arranged on the distribution axle 11, surrounds the distribution axle 11 at least in regions. Said toothing system 50 is configured to pass into engagement as required with a corresponding toothing system 51 which is configured on the control element 13 of the control mechanism. In the case of an actuation of the control element 13, it is therefore possible for an output gear 21 which has previously been moved via the distribution mechanism to be returned automatically again into a starting position. As a result, an adjusted air guiding element in one of the air vents 101 of the air vent system 100 is returned automatically into the starting position. In the case of actuation of the control element 13, the restoring mechanism operates in such a way that the toothing system 51 which is configured on the control element 13 passes into temporary engagement with the toothing systems 50 of a corresponding distribution gear 12 during the adjustment of the control element 13.

Figure 17:
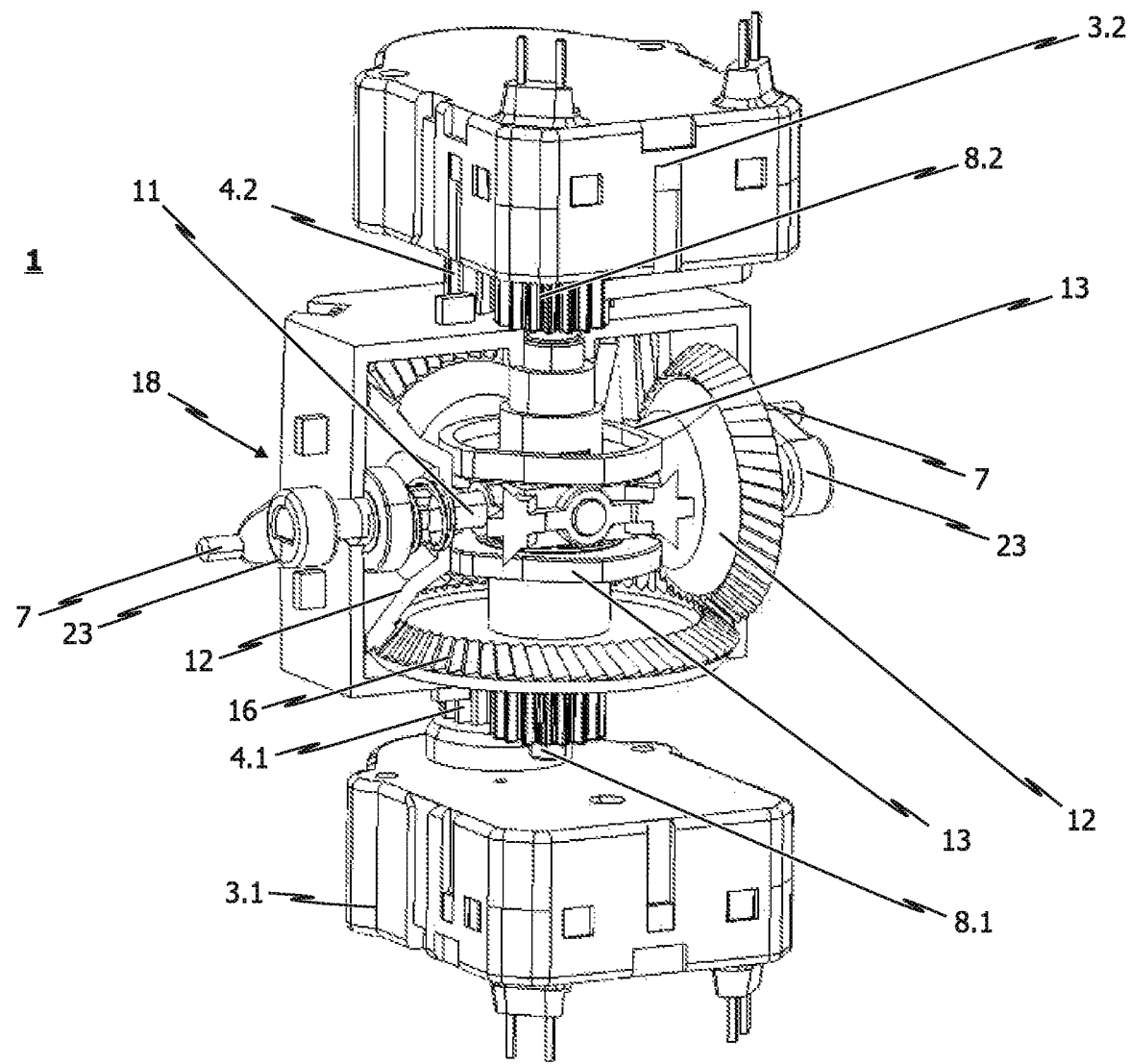

FIG. 17 diagrammatically shows a partially sectioned, isometric view of a ninth exemplary embodiment of a drive unit 1 according to the present invention.

The embodiment which is shown in FIG. 17 has an at least substantially identical distribution gear mechanism with a distribution mechanism and a control mechanism, as has been described in the preceding embodiments. In contrast to the preceding embodiments, the drive mechanism 1 in accordance with said embodiment does not have any freewheels or related systems at all, but rather is distinguished by the fact that there are two electric motor drives 3.1, 3.2.

Since many of the elements of the drive unit 1 in accordance with said embodiment are identical or similar to the elements of the drive units of the preceding embodiments, elements of this type are labeled by way of the same designations.

Accordingly, the drive unit 1 has a first electric motor drive 3.1 in the form of an electric motor with a first drive shaft 4.1 which can be driven as required in a first rotational direction or in a second rotational direction which is opposed to the first rotational direction. Furthermore, the drive unit 1 has a second electric motor drive 3.2 in the form of an electric motor with a second drive shaft 4.2 which can likewise be driven as required in a first rotational direction or in a second rotational direction which is opposed to the first rotational direction.

In accordance with the preceding embodiments, the drive unit 1 has a switching mechanism which has a multiplicity of (here, precisely four) output gears (in accordance with the output gears 21 of the preceding embodiments) or levers 23 with pins 7. On account of the partially sectioned illustration, only three of the total of four output gears or levers 23 can be gathered from the view which is shown in FIG. 17. In accordance with the preceding embodiments, in each case one function of the air vent system 100 can be actuated via each output gear or each lever 23 of the switching mechanism.

The switching mechanism of the drive unit 1 which is shown in FIG. 17 is configured as a distribution gear mechanism which is assigned the first, second, third and fourth output gear or lever 23. As described at the outset, the distribution gear mechanism has a control mechanism and a distribution mechanism.

In contrast to the preceding embodiments, however, said mechanisms are not connected via freewheels or related systems to a drive shaft of an electric motor drive, but rather each of said mechanisms is connected via one of the first and second drive shafts 4.1, 4.2 to a corresponding electric motor drive of the first and second electric motor drive 3.1, 3.2. Here, the first drive shaft 4.1 of the first electric motor drive 3.1 is connected to the distribution mechanism in such a way that a torque can be transmitted in the first or the second rotational direction from the first drive shaft 4.1 of the first electric motor drive 3.1 to the distribution mechanism. Furthermore, the second drive shaft 4.2 of the second electric motor drive 3.2 is connected to the control mechanism in such a way that a torque can be transmitted in the first or the second rotational direction from the second drive shaft 4.2 of the second electric motor drive 3.2 to the control mechanism.

The first drive shaft 4.1 of the first electric motor drive 3.1 is connected to the gearwheel (bevel gear 16) in such a way that a torque of a first or second rotational direction can be transmitted to the bevel gear 16. It is to be mentioned in this context that the first drive shaft 4.1 can be connected either directly or via a first input shaft 8.1 of the distribution gear mechanism to the bevel gear 16. In a case of this type, the first input shaft 8.1 is assigned to the distribution mechanism. The bevel gear 16 drives the individual distribution gears 12 of the distribution axles 11 via a bevel toothing system. It is therefore possible for a torque to be transmitted both in the first rotational direction and in the second rotational direction from the first drive shaft 4.1 of the first electric motor drive 3.1 via the bevel gear 16 to the individual distribution gears 12, depending on which one of the distribution gears 12 is coupled to a corresponding associated output gear or lever 23 or a correspondingly associated output shaft so as to transmit said torque to the corresponding output gear or lever 23 or the corresponding output shaft and therefore to adjust or to manipulate the actuating members of at least one air vent 101 of the air vent system 100.

In accordance with the preceding embodiments, the control mechanism of the distribution gear mechanism has at least one control element 13 which can be configured in the form of cam plates or else as a cam disk or slotted guide. In the case of a drive of the second drive shaft 4.2 of the second electric motor drive 3.2, the at least one control element 13 can be actuated in order to selectively couple the corresponding distribution gear 12 to the correspondingly associated output gear or lever 23 of the distribution gear mechanism. For this purpose, a coupling mechanism 18 can be provided, as described in the preceding embodiments. It is likewise to be mentioned that the second drive shaft 4.2 can be connected either directly or via a second input shaft 8.2 of the distribution gear mechanism to the control element 13. In the case of this type, the second input shaft 8.2 is assigned to the control mechanism. Unlike in the preceding embodiments, however, it is possible in the case of a drive unit 1 in accordance with said embodiment to actuate the control element 13 both in the first rotational direction and in the second rotational direction via the second electric motor drive 3.2. The distribution gears 12 are therefore to be coupled flexibly to the correspondingly associated output gear or lever 23 of the distribution gear mechanism, without it being necessary for all coupling positions to be run through one after another.

Owing to the fact that torque can be transmitted both in the first rotational direction and in the second rotational direction, it is possible to move the coupling rods 17 which are connected to the various output elements (output gear, output shaft and/or lever with pins) flexibly to and fro in a translational manner, and therefore to adjust or to manipulate the actuating members, which are connected to the corresponding coupling rods 17, of at least one air vent 101 of the air vent system 100 in a correspondingly flexible manner between two end stops, end positions or end locations. Furthermore, in the case of visible air guiding elements, adjusting beyond a dead center can be avoided. Moreover, dead centers can also be avoided between levers 23 and coupling rods 17, which considerably facilitates a manual adjustment of the actuating members or air guiding elements.

Even if the described embodiment has been described with regard to one specific distribution gear mechanism for the sake of simplicity, all the features and/or aspects of the described embodiment, in particular the use of the two electric motor drives 3.1, 3.2 with in each case one drive shaft 4.1, 4.2, can be combined or used with all the distribution gear mechanisms which are described in the preceding embodiments.

Figure 18:
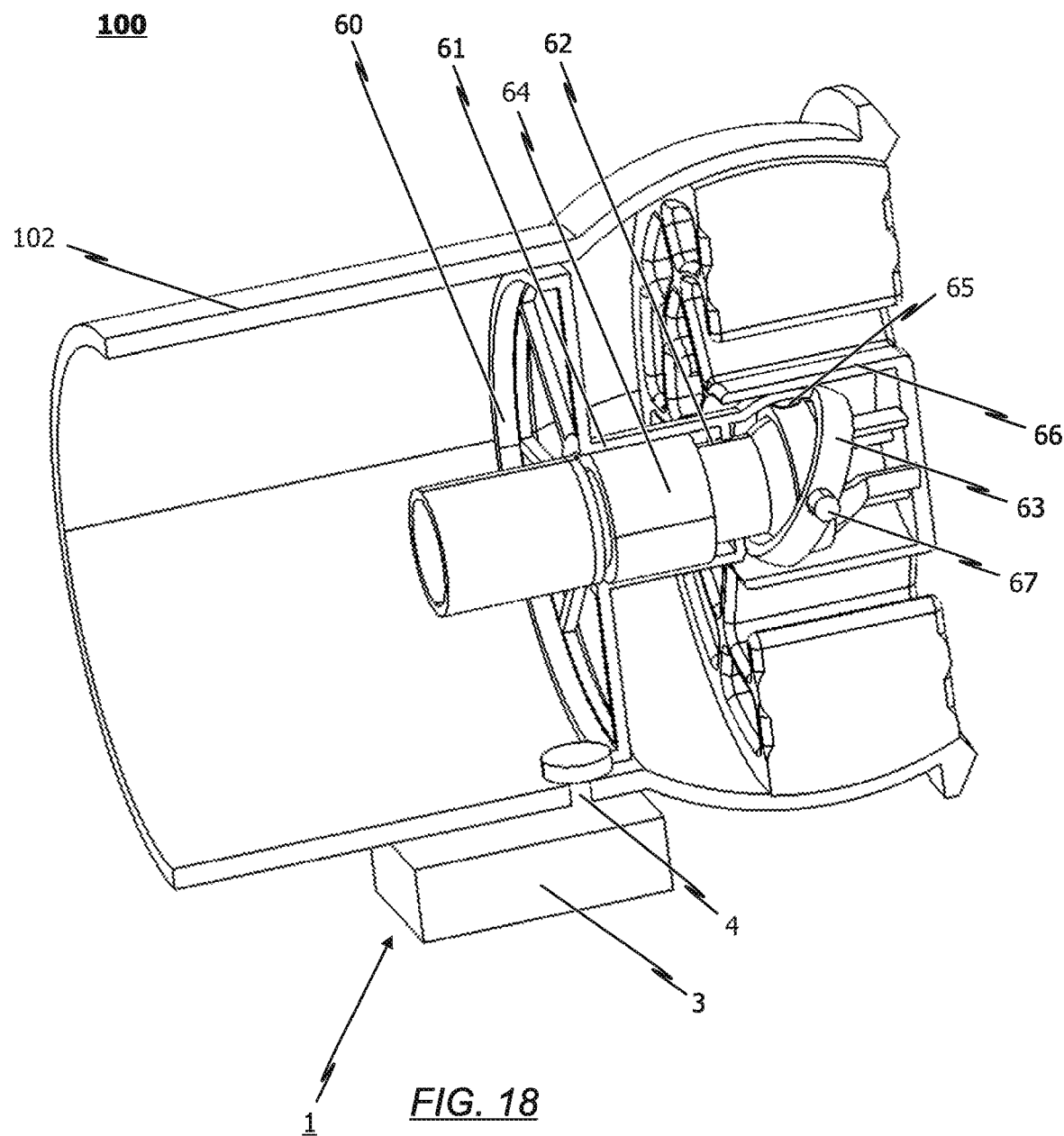

FIG. 18 diagrammatically shows a partially sectioned, isometric view of a drive unit 1 in accordance with a tenth exemplary embodiment of the present invention.

It is also the case here, since some of the elements of the drive unit 1 in accordance with said embodiment are identical or similar to the elements of the drive units of the preceding embodiments, that elements of this type are labeled by way of the same designations.

The drive unit 1 in accordance with the tenth exemplary embodiment is provided, in particular, for use in an air vent system 100 with cylindrical air vents 102, and to adjust or to manipulate at least one air guiding element and/or actuating member in said air vent system 100. The drive unit 1 has an electric motor drive 3 in the form of an electric motor with a drive shaft 4 which can be driven as required in a first rotational direction or in a second rotational direction which is opposed to the first rotational direction.

The drive shaft 4 is assigned a switching mechanism with a first output shaft 61 and a second output shaft 62, via which in each case one function of the air vent system 100 can be actuated. The switching mechanism is configured, in the case of a drive of the drive shaft 4 in the first rotational direction, to transmit a torque from the drive shaft 4 only to the first output shaft 61, and, in the case of a drive of the drive shaft 4 in the second rotational direction, to transmit a torque from the drive shaft to the first output shaft 61 and the second output shaft 62.

In particular, the drive shaft 4 is assigned a switching mechanism which has a disk or a gear 60, the first output shaft 61, the second output shaft 62, an annular element 63 and a freewheel 64. The drive shaft 4 is connected to the disk or the gear 60 of the switching mechanism in such a way that the disk or the gear 60 can be driven via the drive shaft 4 in a first rotational direction or in a second rotational direction which is opposed to the first rotational direction, and/or the torque can be transmitted in the first rotational direction or the second rotational direction. The first output shaft 61 is assigned to a central region, that is to say a region which has a rotational axis of the disk or the gear 60. The first output shaft 61 is configured as a hollow shaft, and can either be configured integrally with the disk or the gear 60 or can be molded onto the disk or the gear 60. The first output shaft 61 has a cylindrical region which adjoins the disk or the gear 60, and a spherical end region which faces away from the disk or the gear 60 and adjoins the cylindrical region. An end side of the first output shaft 61, which end side is assigned to the spherical end region, is beveled in the direction of the disk or the gear 60 at a defined angle, preferably of between 0° and 45°. The annular element 63 is arranged on the beveled end face of the first output shaft 61 in such a way that the annular element 63 makes contact with the end face of the first output shaft 61. The annular element 63 can slide along the beveled end face of the first output shaft 61.

The second output shaft 62 is received in the first output shaft 61. The second output shaft 62 is likewise configured as a hollow shaft, in particular as a sleeve. The second output shaft 62 has a shape which corresponds to the first output shaft 61, that is to say it has a cylindrical region and a spherical end region which adjoins said region. Furthermore, in a state in which it is arranged in the cylindrical air vent 102, the second output shaft 62 is arranged on a central housing element of the air vent 102 in such a way that possible relative movement which occurs of the two elements with respect to one another is merely small, and is preferably prevented completely. A possible movement of the second output shaft 62 on the central housing element is therefore braked.

Furthermore, a freewheel 64 is arranged between the second output shaft 62 and the first output shaft 61 in regions, in particular between the two cylindrical regions of the first output shaft 61 and the second output shaft 62. On an outer face of its spherical end region, the second output shaft 62 has two pin-shaped elements 65, by means of which an air guiding element 66 is mounted such that it can be rotated in a first and second rotational direction. The two pin-shaped elements 65 are arranged so as to lie opposite one another on the outer face of the second output shaft 62. Furthermore, in a region, by way of which it is mounted on the second output shaft 62, the air guiding element 66 has two pin-shaped elements 67 which mount the annular element 63 such that it can be rotated in a first and second rotational direction. Said two pin-shaped elements 67 are also arranged so as to lie opposite one another.

In the position which is shown in FIG. 18, the air guiding element 67 is arranged in a non-adjusted or non-manipulated state in an air vent 102. The electric motor drive 3 drives the disk or the gear 60 in a first direction, with the result that the annular element 63 slides along the beveled end face of the first output shaft 61. Here, the second output shaft 62 is decoupled from the rotational movement of the first output shaft 61 via the freewheel 64. If the electric motor drive 3 has rotated the disk or the gear 60, for example, at an angle of 90°, the annular element 63 and therefore also the air guiding element 66 are inclined toward one side in a manner which is dependent on the angle of the beveled end face and the rotary angle of the disk or the gear 60. If the disk or the gear 62 is rotated, for example, at a smaller angle than 90°, the air guiding element 66 is inclined toward the side to a correspondingly lesser extent. Therefore, combined, multiple-axle tilting of the air guiding element 66 about the elements 65 of the second output shaft 62 and the elements 67 of the air guiding element 66 can therefore be produced via an adjustment or rotation of the disk or the gear 60 by between 0° and 90°.

If the desired (lateral) deflection of the air guiding element 66 is set, the rotational direction of the motor can be changed, and the disk or the gear 60 rotates in the second rotational direction. In this case, the second output shaft 62 is coupled via the freewheel 64 to the first output shaft 61, and the entire arrangement consisting of disk or gear 60, first output shaft 61, second output shaft 62, annular element 63, freewheel 64 and air guiding element 66 is adjusted or rotated until a desired orientation or direction of the air guiding element 66 is reached. Therefore, the drive unit 1 allows first of all a lateral deflection angle of the air guiding element 66 to be set by means of the introduction of a torque in the first rotational direction, and subsequently the air guiding element 66 to be adjusted or to be rotated in a further direction by means of the introduction of a torque in the second rotational direction, with the result that an air flow can flow out of the air vent 102 in a provided direction in a targeted manner.

Figure 19:
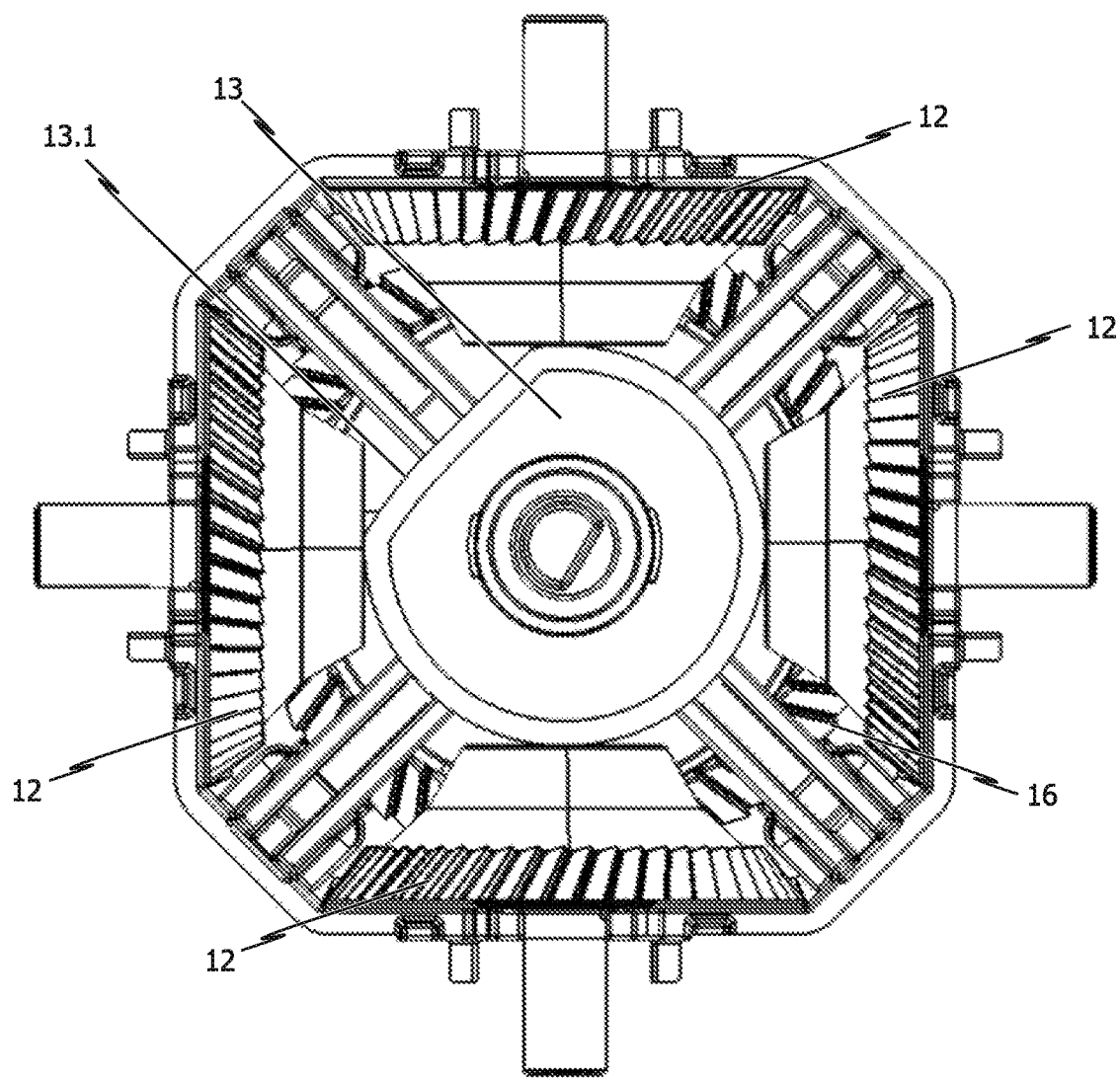
Figure 20:
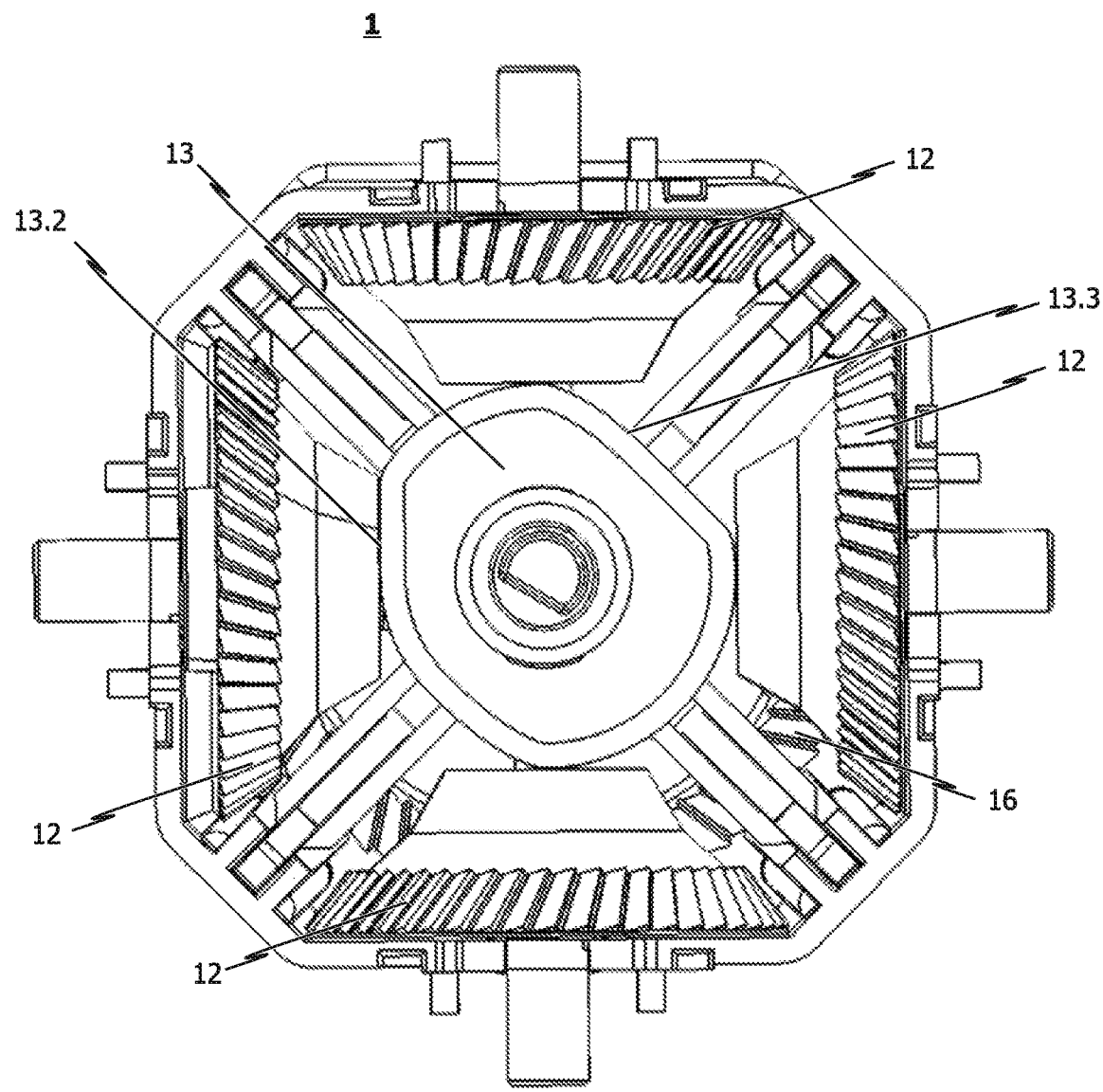

FIGS. 19 and 20 show embodiments of the drive unit 1, in particular of the control element 13 of the switching mechanism. For reasons of clarity, merely the components or elements which are relevant for the functionality are provided with designations in the figures. The control element 13 is configured as a cam disk in the two embodiments. The cam disks which are shown in FIGS. 19 and 20 are to be used, in particular, in conjunction with the embodiment which is described in FIG. 15. It is fundamentally also conceivable, however, for said cam disks to be used in all embodiments of the drive unit according to the invention.

Via the use of the cam disks which are shown in FIGS. 19 and 20, it is possible to couple only precisely one distribution gear or bevel gear 12 to the bevel gear 16, to couple or decouple more than one distribution gear or bevel gear 12, preferably two, particularly preferably two distribution gears or bevel gears 12 which lie opposite one another, to/from the bevel gear 16, or else to decouple all distribution gears or bevel gears 12 from the bevel gear 16.

In FIG. 19, the cam disk is formed or configured in such a way that it has a flattened side 13.1 on its at least substantially cylindrical circumferential face. In that position of the cam disk which is shown in FIG. 19, all distribution gears or bevel gears 12 are decoupled from the bevel gear 16. If the cam disk is moved out of the illustrated position, in particular by 45°, one of the distribution gears or bevel gears 12 can be brought into engagement with the bevel gear 16, the other distribution gears or bevel gears 12 still being decoupled from the bevel gear 16. A position of the cam disk, in which position all distribution gears or bevel gears 12 are decoupled from the bevel gear 16, is to be considered advantageous, in particular, if a manual adjustment of air guiding elements in the air vent or in the air vents is also still to be provided despite the motorized adjustment.

In FIG. 20, the cam disk is formed or configured in such a way that it has a plurality of flattened sides 13.2, 13.3 on its at least substantially cylindrical circumferential face. As a result, it is possible not only to couple or to decouple precisely one distribution gear or bevel gear 12 to/from the bevel gear 16, but rather also to couple or to decouple a plurality of distribution gears or bevel gears 12, in particular in the case of a rotation of the cam disk by 45°. In accordance with one preferred embodiment, two distribution gears or bevel gears 12 which lie opposite one another can be coupled and decoupled to/from the bevel gear 16 via said cam disk. In the position which is shown in FIG. 20, one of the distribution gears or bevel gears 12 is situated in a position in which it is coupled to the bevel gear 16. If the cam disk is rotated in the clockwise direction, for example, by 45°, the coupled distribution gear or bevel gear 12 remains coupled, whereas the distribution gear or bevel gear 12 which lies opposite it is coupled to the bevel gear 16, by being displaced in the direction of the flattened side of the cam disk. As a result, it is possible, in the case of the use of two air vents which are adjacent with respect to one another, for air guiding elements in said air vents to be moved synchronously, for example in a wagging manner.

It is fundamentally also possible, by way of the above-described embodiment which is shown in FIG. 19, to combine both the decoupling of all distribution gears or bevel gears 12 (as shown in FIG. 19) and possible coupling of further distribution gears or bevel gears 12 (as shown in FIG. 20). Here, the cam disk would have to be moved further by 30° in its functional position, in which precisely one distribution gear or bevel gear 12 is coupled. If it is rotated further by 30° again out of said position, in which two distribution gears or bevel gears 12 are coupled, it passes into a position, in which all distribution gears or bevel gears 12 are decoupled from the bevel gear 16. If all distribution gears or bevel gears 12 are moved or coupled and decoupled by way of the same stroke, the size or the diameter of the cam disk is possibly to be adapted, in order to assure the above-described synchronous running of the distribution gears or bevel gears 12 with the cam disk from FIG. 19.

The invention claimed is:

1. A drive unit for actuating a plurality of functions of an air vent system or of an air distribution system, for individually setting an air flow quantity which passes one air duct of a multiplicity of air ducts of the air distribution system per unit time, the drive unit having an electric motor drive with a drive shaft which can be driven as required in a first rotational direction or in a second rotational direction,
wherein the drive unit having a switching mechanism which is assigned to the drive shaft with a first output shaft and a second output shaft, via which one function of the air vent system can be actuated, the switching mechanism being configured, in the case of driving of the drive shaft in the first rotational direction, to couple one of the first output shaft or the second output shaft so as to be rotated by the drive shaft of the electric motor drive and to decouple the other of the first output shaft or the second output shaft from being rotated by the drive shaft, and, in the case of driving of the drive shaft in the second rotational direction, to transmit a torque from the drive shaft of the electric motor drive to the one of the first output shaft or the second output shaft that is coupled so as to be rotated by the drive shaft of the electric motor drive;
wherein the switching mechanism includes a bevel gear assigned to be rotated by the drive shaft, a first distribution gear assigned to the first output shaft and having a first rotational axis, and a second distribution gear assigned to the second output shaft and having a second rotational axis, wherein the switching mechanism is configured such that, during rotation of the drive shaft in the first rotational direction, the first distribution gear is moved along the first rotational axis to move the first distribution gear into and out of contact with the bevel gear and the second distribution gear is moved along the second rotational axis to move the second distribution gear into and out of contact with the bevel gear.

2. An air vent system with at least one air vent and the drive unit as claimed claim 1.

3. A drive unit for actuating a plurality of functions of an air vent system or of an air distribution system, for individually setting an air flow quantity which passes one air duct of a multiplicity of air ducts of the air distribution system per unit time, the drive unit having an electric motor drive with a drive shaft which can be driven as required in a first rotational direction or in a second rotational direction,
wherein the drive unit has a distribution gear mechanism that includes a bevel gear assigned to be rotated by rotation of the drive shaft of the electric motor drive, with a first output shaft having an assigned first distribution gear, a second output shaft having an assigned second distribution gear and a third output shaft having an assigned third distribution gear, via which respectively one function of the air vent system can be actuated, the distribution gear mechanism being configured to selectively transmit a torque from the drive shaft of the electric motor drive to one or more of the first, second and third output shafts,
the distribution gear mechanism being configured, in the case of driving of the drive shaft in the first rotational direction, to couple one of the first, second or third distribution gears to the bevel gear and to decouple the other distribution gears from the bevel gear, and, in the case of driving of the drive shaft in the second rotational direction, to transmit a torque from the drive shaft of the electric motor drive via the bevel gear to the one of the first, second or third distribution gears that is coupled to the bevel gear.

4. The drive unit as claimed in claim 3, the distribution gear mechanism having a control mechanism which is connected via a first freewheel to the input shaft of the distribution gear mechanism in such a way that, only in the case of driving of the drive shaft of the electric motor drive in the first rotational direction, a torque is transmitted from the drive shaft of the electric motor drive to the control mechanism, and the distribution gear mechanism having a distribution mechanism which is connected via a second freewheel to the input shaft of the distribution gear mechanism in such a way that, only in the case of driving of the drive shaft of the electric motor drive in the second rotational direction, a torque is transmitted from the drive shaft of the electric motor drive to the distribution mechanism.

5. The drive unit as claimed in claim 4, the distribution gear mechanism having a coupling mechanism for each of the first, second and third distribution gears.

6. The drive unit as claimed in claim 4, the control mechanism having a control element, in the form of at least one cam plate, at least one cam disk, at least one slotted guide and/or at least one eccentric.

7. The drive unit as claimed in claim 6, the control element being configured, in the case of a drive of the electric motor drive in the first rotational direction, to selectively move the first, second and third distribution gears into or out of contact with the bevel gear.

8. An air vent system with at least one air vent and the drive unit as claimed claim 3.

9. A drive unit for actuating a plurality of functions of an air vent system or of an air distribution system, the drive unit having an electric motor drive with a drive shaft which can be driven as required in a first rotational direction or in a second rotational direction,
wherein the drive unit has a distribution gear mechanism that includes:
a bevel gear assigned to be rotated by rotation of the drive shaft of the electric motor drive,
a first output shaft having an assigned first distribution gear and a first rotational axis, a second output shaft having an assigned second distribution gear and a second rotational axis, and a third output shaft having an assigned third distribution gear and a third rotational axis, via which respectively one function of the air vent system can be actuated,
the distribution gear mechanism being configured to selectively transmit a torque from the drive shaft to one or more of the first, second and third output shafts when driving the drive shaft in the second rotational direction,
the distribution gear mechanism being configured, in the case of driving of the drive shaft in the first rotational direction, to move the first, second and third distribution gears along the respective first, second and third rotational axes to define which of the first, second and third distribution gears is connected to the bevel gear.

10. The drive unit of claim 9, wherein the distribution gear mechanism is configured, in the case of driving of the drive shaft in the second rotational direction, to transmit a torque from the drive shaft of the electric motor drive via the bevel gear to any of the first, second or third distribution gears that is coupled to the bevel gear.

11. An air vent system with at least one air vent and the drive unit as claimed claim 9.

* * * * *